US006561167B2

(12) United States Patent
Berndt

(10) Patent No.: US 6,561,167 B2
(45) Date of Patent: May 13, 2003

(54) AIR ASSIST FUEL INJECTORS

(75) Inventor: Carsten Berndt, Yorktown, VA (US)

(73) Assignee: Synerject, LLC, Newport News, VA (US)

( * ) Notice: Subject to any disclaimer, the term of this patent is extended or adjusted under 35 U.S.C. 154(b) by 0 days.

(21) Appl. No.: 09/783,993

(22) Filed: Feb. 16, 2001

(65) Prior Publication Data

US 2002/0112705 A1 Aug. 22, 2002

(51) Int. Cl.[7] ............................................... F02M 23/00
(52) U.S. Cl. ...................................... 123/531; 239/408
(58) Field of Search .......................... 123/531; 239/408, 239/585.1

(56) References Cited

U.S. PATENT DOCUMENTS

| 4,781,164 A | 11/1988 | Seeber et al. |
| 4,934,329 A | 6/1990 | Lear et al. |
| 4,936,279 A | 6/1990 | Ragg |
| 5,024,202 A | 6/1991 | McKay |
| 5,094,217 A | 3/1992 | Kaku et al. |
| 5,123,399 A | 6/1992 | Motoyama et al. |
| 5,170,766 A | 12/1992 | Haas et al. |
| 5,205,254 A | 4/1993 | Ito et al. |
| 5,220,301 A | 6/1993 | Haas et al. |
| 5,483,944 A | 1/1996 | Leighton et al. |
| 5,622,155 A | 4/1997 | Ellwood et al. |
| 5,730,108 A | 3/1998 | Hill |
| 5,794,856 A * | 8/1998 | Nally ........................... 239/408 |
| 5,829,407 A | 11/1998 | Watson et al. |
| 5,904,299 A * | 5/1999 | Hans et al. .................. 239/408 |
| 5,979,786 A | 11/1999 | Longman et al. |
| 5,983,865 A | 11/1999 | Yamashita et al. |
| 6,161,527 A | 12/2000 | Ruman |
| 6,302,337 B1 * | 10/2001 | Kimmel ....................... 239/408 |
| 2002/0084364 A1 * | 7/2002 | Dallmeyer et al. ....... 239/585.1 |

FOREIGN PATENT DOCUMENTS

| DE | 198 49 113 A1 | 5/2000 |
| EP | 0879953 | 11/1998 |
| JP | 10159689 A | 6/1998 |
| WO | WO 99/28621 | 6/1999 |
| WO | WO 99/58847 | 11/1999 |

* cited by examiner

Primary Examiner—Noah P. Kamen
(74) Attorney, Agent, or Firm—Cooley Godward LLP

(57) ABSTRACT

An air assist fuel injector system having an air assist fuel injector. The air assist fuel injector includes an integral projection having a recess therein for receiving a fuel injector. The air assist fuel injector also includes a conduit for receiving pressurized gas from a channel of a head of an engine.

82 Claims, 13 Drawing Sheets

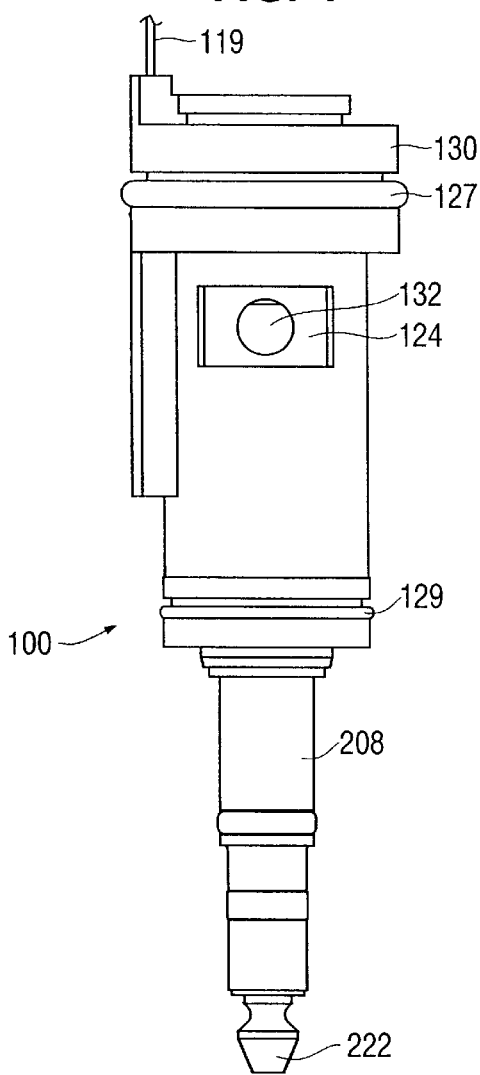
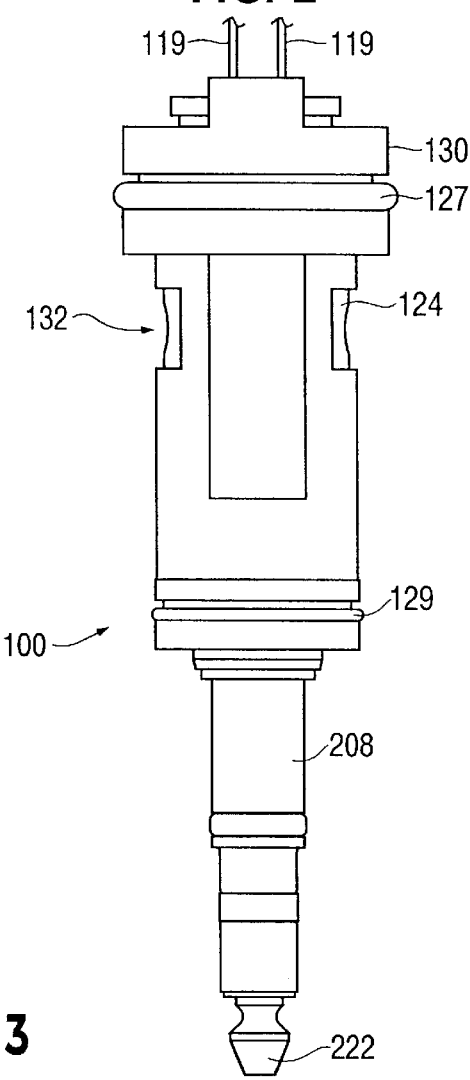
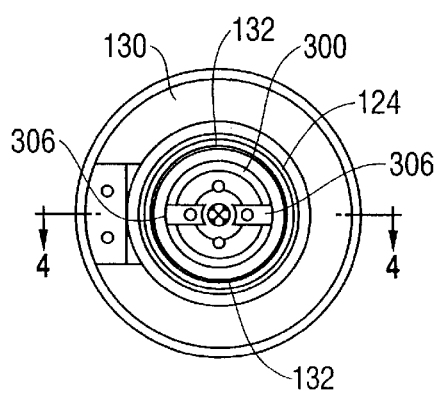

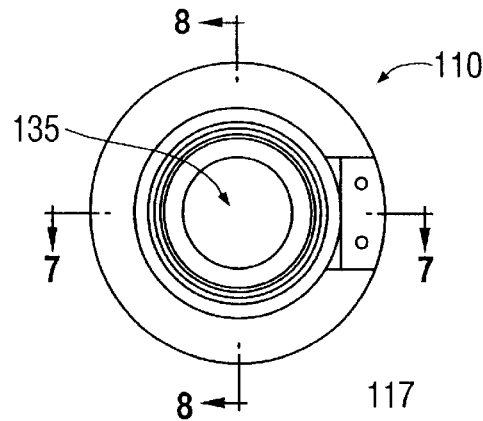
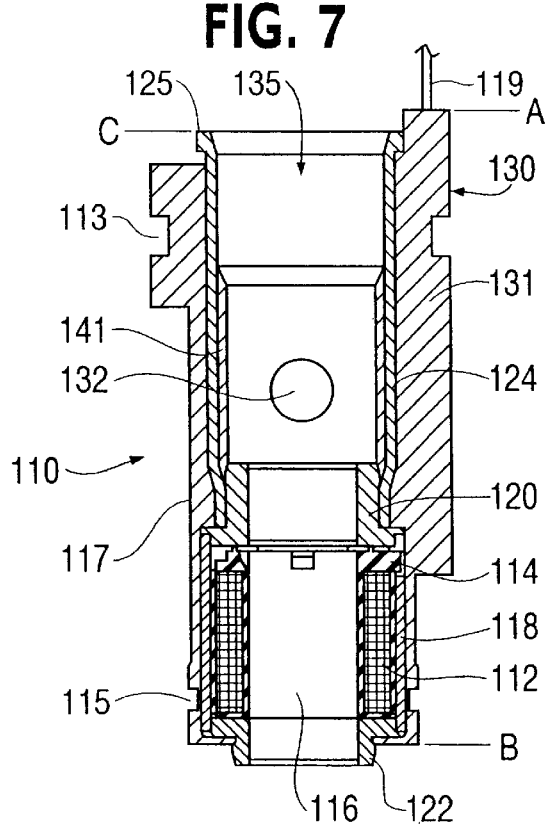
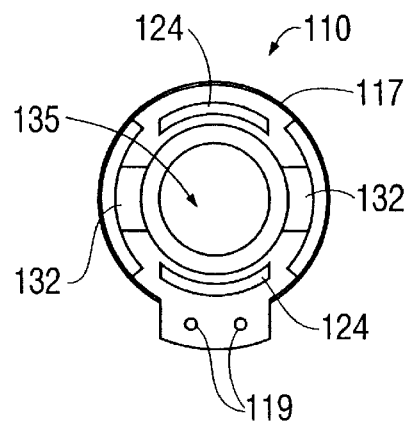
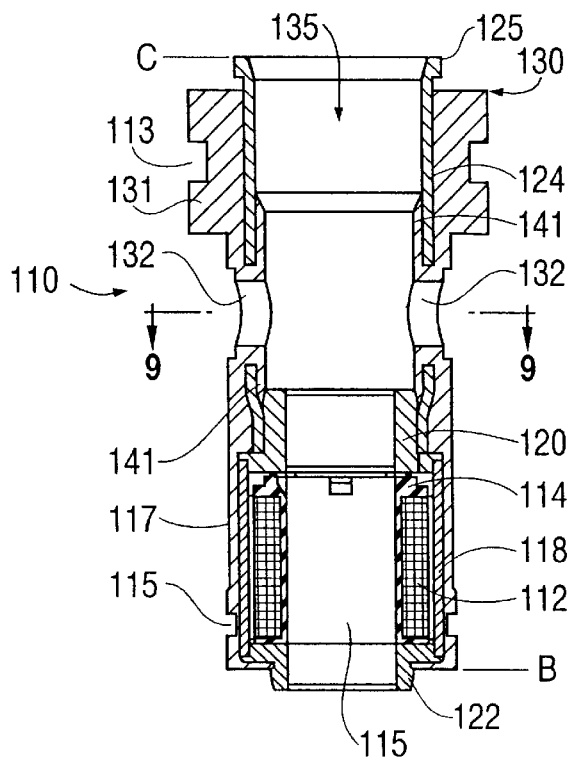

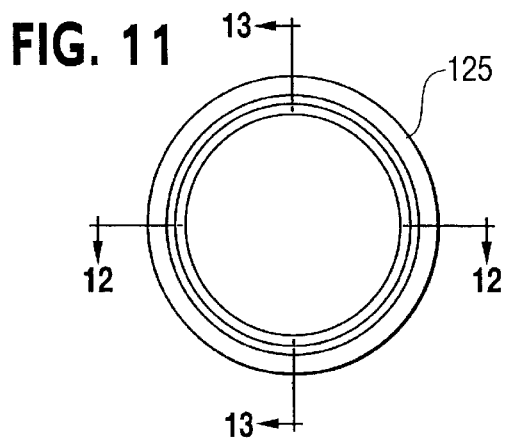
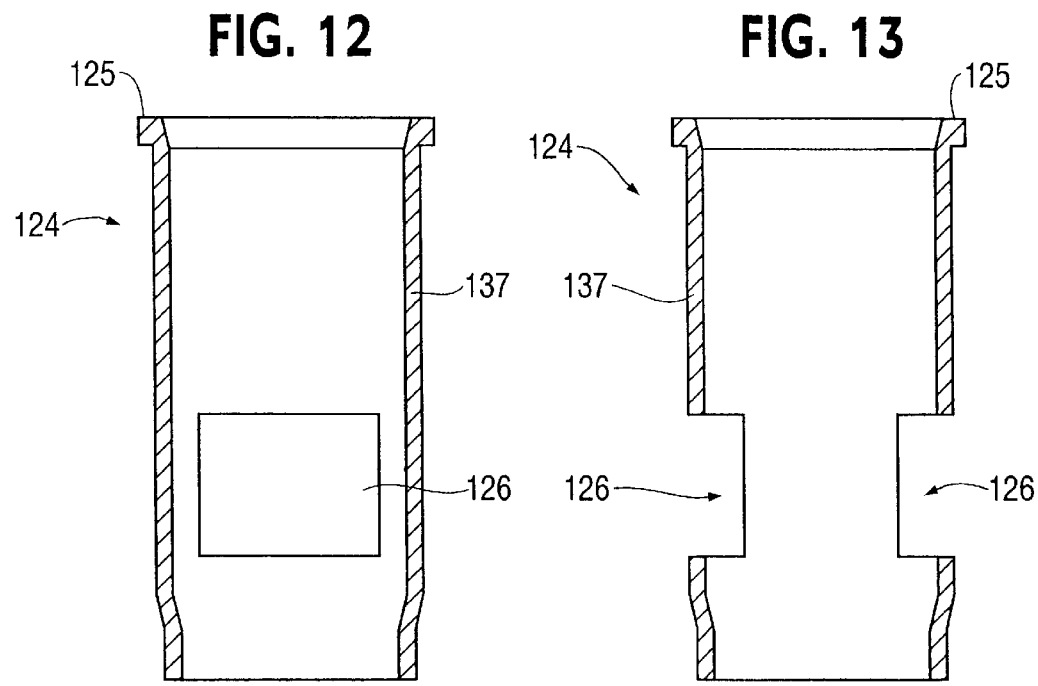

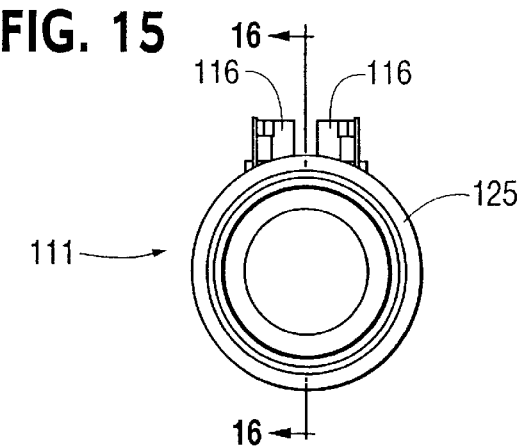
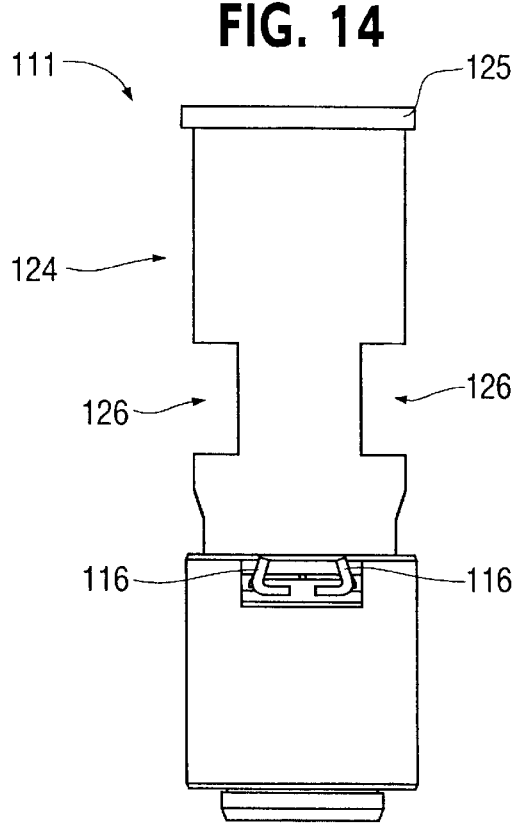
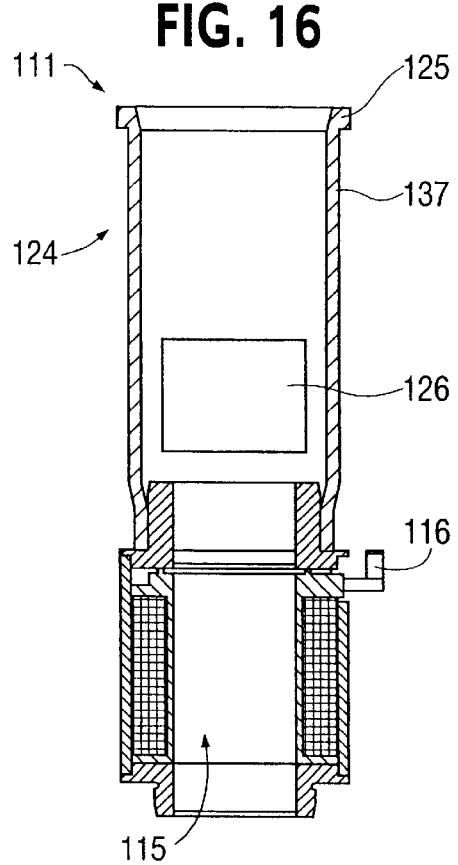

AIR ASSIST FUEL INJECTORS

BACKGROUND OF THE INVENTION

1. Field of the Invention

The present invention relates to air assist fuel injection systems, to air assist fuel injectors that are configured to receive a fuel injector, and to air assist fuel injectors that are configured to receive pressurized gas from a head of an engine.

2. Description of the Related Art

Conventional fuel injectors are configured to deliver a quantity of fuel to the combustion cylinder of an engine. To increase combustion efficiency and decrease pollutants, it is desirable to atomize the delivered fuel. Generally speaking, atomization of fuel can be achieved by supplying high pressure fuel to conventional fuel injectors, or by atomizing low pressure fuel with pressurized gas, i.e., "air assist fuel injection." To carry out air assisted fuel injection, pressurized gas and liquid fuel are supplied to air assist fuel injectors, which utilize the pressurized gas to atomize the liquid fuel.

Because the amount of space in the engine compartment of many vehicles is limited, it is generally desirable to minimize the size of air assist fuel injection systems, which typically include one or more air assist fuel injectors, one or more fuel injectors for delivering metered quantities of fuel to the air assist fuel injectors, and a rail for delivering pressurized gas and fuel to the injectors. In a typical configuration, the fuel injector is located upstream of the air assist fuel injector and is housed by a rail that supplies fuel to the fuel injector. The fuel injector receives the fuel from the rail and delivers metered quantities of the fuel directly or indirectly to the air assist fuel injector, which often mounts to the rail. Besides communicating fuel to the fuel injector and housing the fuel injector, such rails also typically include one or more internal passageways and external lines that deliver pressurized gas to the air assist fuel injector. The air assist fuel injector atomizes the fuel delivered from the fuel injector with the pressurized gas delivered from the rail and conveys the gas and fuel mixture to the combustion chamber of the engine.

As is apparent, in the conventional configuration, the fuel injector, the rail, and external lines associated therewith occupy critical space above the air assist fuel injector and cylinder head of the engine. Some conventional configurations have attempted to minimize the amount of space occupied by such systems by incorporating variously configured rails, such as rails that mount the fuel injector transverse to the air assist fuel injector. Despite such configurations, there still exists a tremendous need to decrease the space occupied by air assist fuel injection systems.

SUMMARY OF THE INVENTION

In light of the previously described problems associated with conventional air assist fuel injection systems, one object of the embodiments of the present invention is to provide an air assist fuel injection system that occupies less space than some conventional configurations.

Other objects, advantages, and features associated with the embodiments of the present invention will become more readily apparent to those skilled in the art from the following detail description. As will be realized, the invention is capable of other and different embodiments, and its several details are capable of modification and various obvious aspects, all without departing from the invention. Accordingly, the drawings and the description are to be regarded as illustrative in nature, and not limitative.

BRIEF DESCRIPTION OF THE DRAWINGS

FIG. 1 is side view of an air assist fuel injector in accordance with one embodiment of the present invention.

FIG. 2 is a front view of the air assist fuel injector illustrated in FIG. 1.

FIG. 3 is a top view of the air assist fuel injector illustrated in FIG. 1.

FIG. 6 is a top view of the solenoid assembly of the air assist fuel injector illustrated in FIG. 1.

FIG. 7 is a cross-sectional view of the solenoid assembly illustrated in FIG. 6 taken along the line 7—7 in FIG. 6.

FIG. 8 is a cross-sectional view of the solenoid assembly illustrated in FIG. 6 taken along the line 8—8 in FIG. 6.

FIG. 9 is a cross-sectional view of the solenoid assembly illustrated in FIG. 6 taken along the line 9—9 in FIG. 8.

FIG. 11 is a top view of the metallic tube of the air assist fuel injector illustrated in FIG. 1.

FIG. 12 is a cross-sectional view of the metallic tube illustrated in FIG. 11 taken along the line of 12—12 in FIG. 11.

FIG. 13 is a cross-sectional view of the metallic tube illustrated in FIG. 11 taken along the line 13—13 in FIG. 11.

FIG. 14 is a side view of the solenoid sub-assembly of the air assist fuel injector illustrated in FIG. 1.

FIG. 15 is a top view of the solenoid sub-assembly illustrated in FIG. 14.

FIG. 16 is a cross-sectional view of the solenoid sub-assembly illustrated in FIG. 14 taken along the line 16—16 in FIG. 15.

DETAILED DESCRIPTION OF THE PREFERRED EMBODIMENTS

Figure 4:
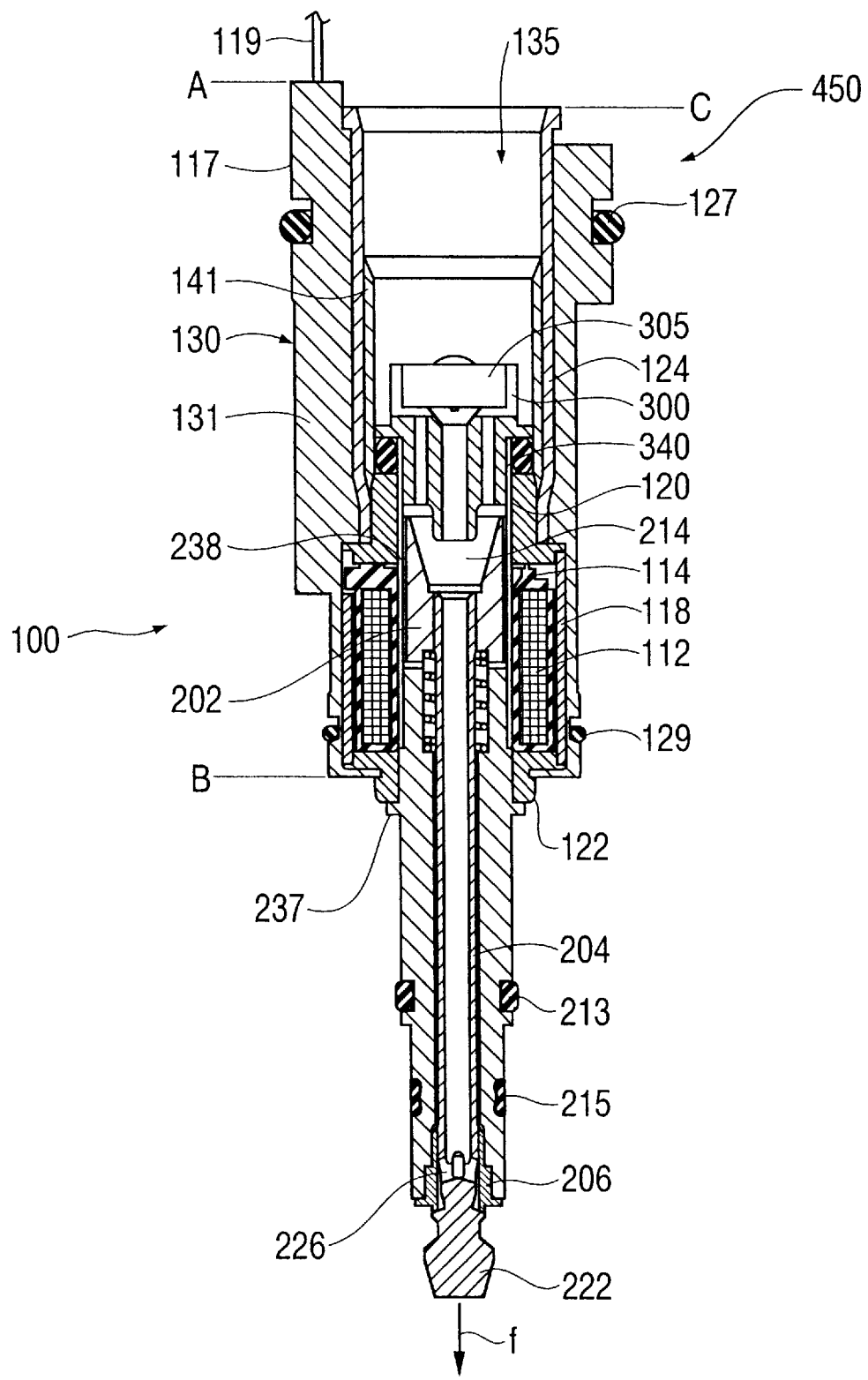
FIG. 4 is a cross-sectional view of the air assist fuel injector illustrated in FIG. 1 taken along the line 4—4 in FIG. 3.

FIGS. 1–23 illustrated components of one embodiment of an air assist fuel injector 100 according to the present invention. The air assist fuel injector 100 utilizes pressurized gas to atomize low pressure liquid fuel, which together travel through the air assist fuel injector 100 along a direction of flow f, as indicated in FIG. 4. As a brief overview, and as described further below, the air assist fuel injector 100 includes an integral projection having a recess therein for receiving a fuel injector. The air assist fuel injector 100 also includes a conduit for receiving pressurized gas from a channel of a head of an engine.

As illustrated in FIGS. 4–10, the air assist fuel injector 100 includes two primary assemblies: a solenoid assembly 110 and a valve assembly 200. The solenoid assembly 110 at least includes a solenoid coil 112 of insulated conductive wire wrapped around a tubular bobbin 114 and two or more electrical terminals 116 (see FIGS. 5 and 13–15) via which the solenoid coil may be energized.

The bobbin 114 of the solenoid assembly 110 is a spool on which the conductor of the coil 112 is wound. Bobbin 114 also defines a throughhole 115, in which an armature 202 is electromagnetically actuated, as further described below. In the illustrated embodiment, the bobbin 114 and the coil 112 are located at least partially within a housing of soft magnetic steel, defined by a tubular member 118, an upper retainer 120, and a lower retainer 122.

The upper retainer 120 and the lower retainer 122 are annular bodies that partially close-off the ends of the tubular member 118 and retain the bobbin 114 and coil 112 within the tubular member 118. The upper retainer 120 and the lower retainer 122 each include a cylindrical passageway coincident with the throughhole 115 of the bobbin 114. As illustrated in FIG. 4, the cylindrical passageway of the lower retainer 122 and the cylindrical passageway of the upper retainer 120 each receives at least a portion of the valve assembly 200.

The solenoid assembly 110 also includes a casing 130 that houses or encases at least a portion of the solenoid coil 112 such that the solenoid coil is located at least partially in the casing. In the illustrated embodiment, the casing 130 is an injection-molded casing of electrically insulative material, such as glass-filled NYLON 6/6, that extends to a location A upstream of the solenoid coil 112 with respect to the direction of flow f and to a location B downstream of the solenoid coil 112 with respect to the direction of flow f. The casing 130 preferably abuts the housing of the solenoid coil 112, as well as the terminals 116 so as to reduce the level of noise generated by the air assist fuel injector 100, to help prevent corrosion and degradation, and to reduce the possibility of shorting. The casing 130 also at least partially encases two leads 119 that are electrically connected to the terminals 116. The leads 119 protrude from the most upstream surface of the casing 130. In the illustrated embodiment, the leads 119 are insulated wires. In an alternative embodiment, the leads 119 may be physical terminals for a male or female connector.

In alternative embodiments, the casing 130 does not completely encase the solenoid coil 112, the terminals 116, and the leads 119; the casing 130 may only partially encase the solenoid coil 112 and other components of the solenoid assembly 110. For example, the casing 130 may only encase the upper half of the solenoid coil 112, one side of the solenoid coil 112, and/or the terminals 116. Hence, in alternative embodiments, the casing 130 need not abut the solenoid housing and the terminals 116. Most plastics qualify as electrically insulative materials for the casing 130. It is preferred that the material for the casing 130 be compatible with liquid fuels used in most engine applications. Suitable examples include PPS and NYLON. In an alternative embodiment, the material of the casing 130 is not electrically insulative. For example, the casing 130 may be fabricated from drawn stainless steel or molded aluminum.

Because some materials that may be used for the casing 130, such as NYLON, may not withstand the forces occasionally required to remove the air assist fuel injector from the head of an engine, as illustrated by FIGS. 4, and 6–8, the solenoid assembly 110 also includes a metallic tube 124, which is attached to the upper retainer 120, and extends from the upper retainer 120 to a location C upstream of the solenoid coil 112 with respect to the direction of flow f. The illustrated metallic tube 124 is formed from machined 316 stainless steel, but may be other materials such as deep drawn 304 SS. The metallic tube 124 facilitates the removal of the air assist fuel injector 100 from the cavity of an engine because it is attached to the housing of the solenoid coil 112, which, in turn, is attached to the valve assembly 200. The metallic tube 124 is preferably attached to the upper retainer 120 with a YAG laser weld, but, as will be apparent, may be attached in other manners and at other locations. For example, the metallic tube 124 may be attached to the solenoid housing or the leg 208 with an interference fit, an adhesive, a threaded or screwed attachment, a lock and key attachment, a retaining ring attachment, an electron beam weld, an ultrasonic weld, or other known attachments. In an alternative embodiment, the metallic tube 124 defines the upper retainer 120, tubular member 118, and lower retainer 122.

In the illustrated embodiment, the metallic tube 124 includes a removal device 125 for facilitating the removal of the air assist fuel injector 100. The removal device 125 includes a lip or edge that may be engaged by a tool to pull the air assist fuel injector 100 from the head of an engine. In alternative embodiments, the removal device 125 may be defined by one or more holes, a thread, a hexagonal head, or other known structures that facilitate the removal of the air assist fuel injector 100 from the cavity of an engine.

Although the illustrated embodiment of the solenoid assembly 110 includes the metallic tube 124, the air assist fuel injector need not include the metallic tube and still be within the confines of the present invention. For example, the casing 130 may be fabricated from a molded or machined polymer or metal that is sufficiently strong to withstand the forces that are occasionally necessary to remove the air assist fuel injector from the head of an engine. Hence, an alternative embodiment of the air assist fuel injector (not illustrated) does not include the metallic tube 124.

As illustrated in FIGS. 4, 7 and 8, the casing 130 also includes a wall 131 having two conduits 132 passing therethrough for communicating pressurized gas to a recess 135. As illustrated in FIG. 4, the conduits 132 are separate from the recess 135, meaning that the conduits 132 are distinct from the recess 135. In the illustrated embodiment, the wall 131 has a varying thickness because the profile of the wall varies along the length of the casing 130. Each conduit 132 is a passageway through the wall 131 that opens into the recess 135 and through which pressurized gas may be communicated to the recess 135. Alternative embodiments of the solenoid assembly 110 may include more or less conduits 132. For example, the wall 131 of the casing 130 may include one, three, four, or eight conduits 132 passing therethrough and arranged in any variety of different patterns and locations—all for communicating pressurized gas to the recess 135.

In the illustrated embodiment, the wall 131 also defines the recess 135, which, as described further below, receives a fuel injector. The recess 135 is any cavity, alcove, or hollow area configured to receive, matingly receive, take in, or hold at least an outlet of a fuel injector. The conduits 132 communicate an area external of the casing 130 with the recess 135 such that pressurized gas supplied to a volume outside or external of the casing 130 is also communicated to the recess 135. As illustrated in FIG. 4 and as described further below, a cap 300 of the air assist fuel injector 100 is located in the recess 135 and receives the pressurized gas communicated to the recess 135 via the conduits 132.

As is illustrated in FIGS. 8, 11–14, and 16, the metallic tube 124 includes a wall 137 having two conduits 126 passing therethrough. The conduits 126 of the metallic tube 124 are aligned with the conduits 132 of the casing 130 such that pressurized gas communicated by the conduits 132 of the casing 130 is conveyed to the recess 135. In the illustrated embodiment, the conduits 132 of the casing 130 pass through the rectangular periphery of the conduits 126 of the metallic tube 124 and into the interior of the metallic tube 124. That is, a portion of the wall 131 of the casing 130 is located within the interior of the metallic tube 124. The portion of the casing 130 within the interior of the metallic tube 124 extends upward of the conduits 126 and downward of the conduits 126 with respect to the direction of flow $f$ so as to define a tubular ledge 141 within the metallic tube 124. As described further below, the tubular ledge 141 defines a cylindrical surface against which seal members abut to define seals.

Figure 5:
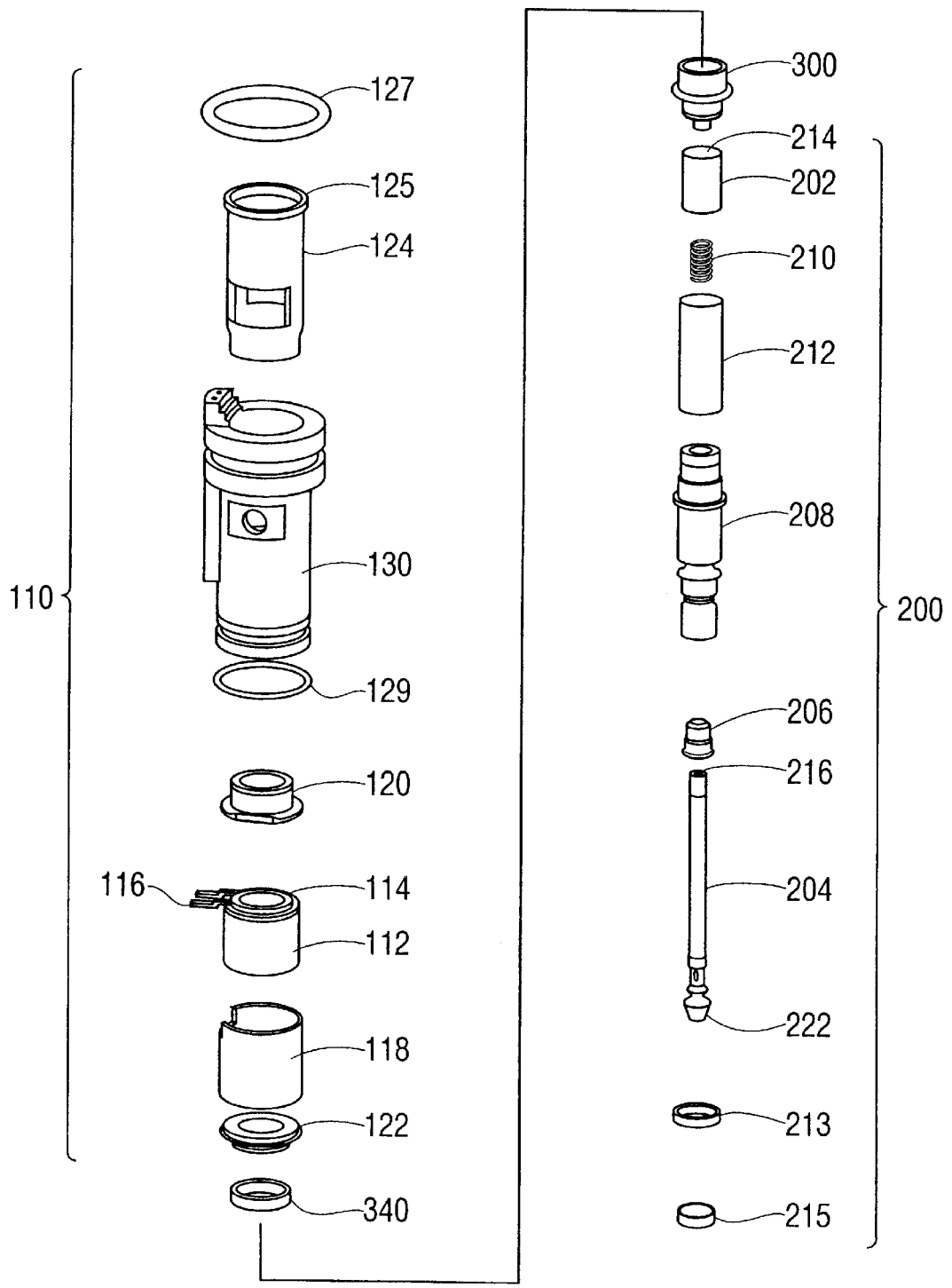
FIG. 5 is an exploded assembly view of the air assist fuel injector illustrated in FIG. 1.

As illustrated in FIGS. 4 and 5 and as described further below, the solenoid assembly 110 also includes an upper seal member 127 and a lower seal member 129. The seal members 127, 129 are each received by a respective seal seat 113, 115 defined by the wall 131 and located n the exterior surface 117 of the casing 130. In the illustrated embodiment, the seal member 127 is an O-ring that defines a seal with a cavity of an engine, and the seal member 129 is an O-ring that also defines a seal with the cavity in a cylinder head of the engine. In alternative embodiments, the seal members 127, 129, and the other seal members described herein, may make other forms. For example, the seal members 127, 129 may be square cut seals or lip seals. As illustrated in FIGS. 4, 7, and 8, the seat 113 is a groove or recess located upstream of the conduits 132 with respect to the direction of flow $f$, and the seat 115 is a groove or recess located downstream of the conduits 132 with respect to the direction of flow $f$.

Although the preferred embodiment of the solenoid assembly 110 includes the items illustrated in the Figures, it will be appreciated that alternative embodiments of the solenoid assembly 110 may include more or less these items, so long as the solenoid assembly 110 includes the solenoid coil 112. For example, the solenoid assembly 110 may only include the coil 112, bobbin 114, terminals 116, and casing 130.

Figure 10:
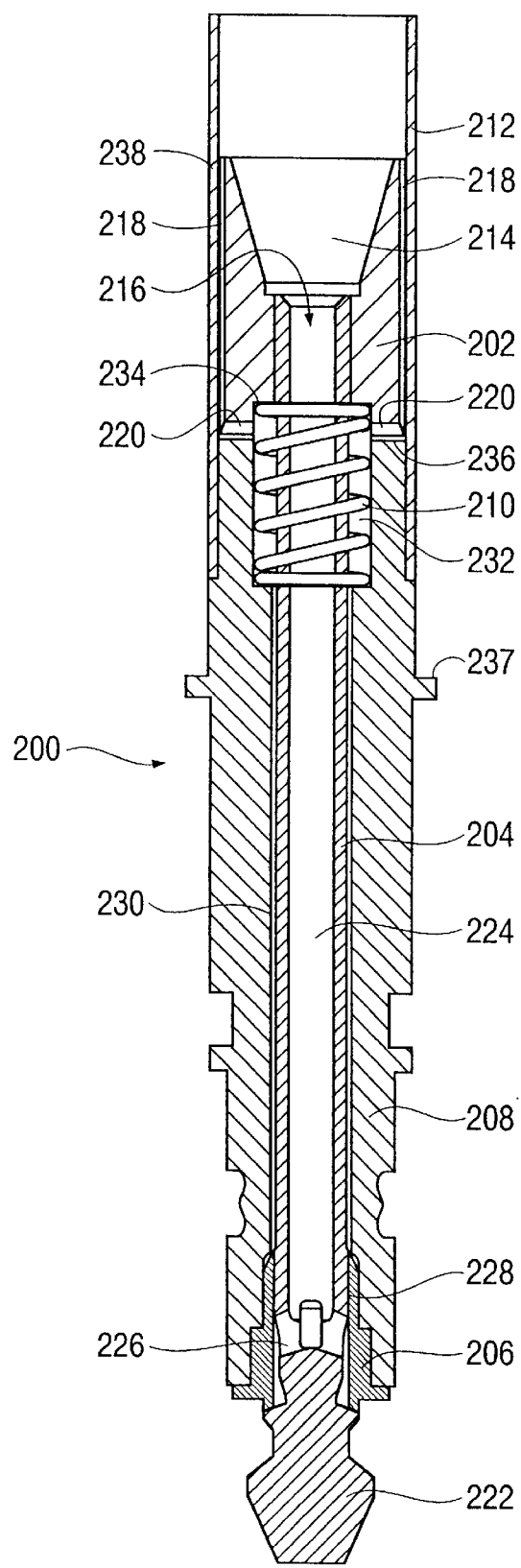
FIG. 10 is a cross-sectional view of the valve assembly of the air assist fuel injector illustrated in FIG. 1.

The valve assembly 200 of the air assist fuel injector 100 defines the dynamic portion of the air assist fuel injector that functions as a valve to deliver the atomized quantity of liquid fuel and gas to the combustion chamber of an engine. As illustrated in FIGS. 5 and 10, the valve assembly 200 includes an armature 202, a poppet 204, a seat 206, a leg 208, a spring 210, a sleeve 212, a seal member 213, and a carbon dam 215. The armature 202 is formed of a ferromagnetic material, such as 430 FR stainless steel or similar, and functions as the moving part of an electromagnetic actuator armature combination. As illustrated in FIG. 4, the armature 202 of the air assist fuel injector 100 is located relative to the solenoid assembly 110 such that the armature 202 is subject to the lines of magnetic flux generated by the solenoid assembly 110 when the solenoid coil 112 is energized. Hence, the armature 202 is actuated when the solenoid coil 112 of the solenoid assembly 110 is energized. In the preferred embodiment, the armature 202 is located partially within the throughhole 115 of the bobbin 114.

Armature 202 includes a passageway 214 that conveys a mixture of liquid fuel and gas to an inlet 216 of the poppet 204. In the illustrated embodiment, the passageway 214 of the armature 202 includes a conical conduit extending from a first end of the armature 202 adjacent a cap 300 (described further below) to the inlet 216 of the poppet 204. Inlet 216 is located at an approximate midpoint along the length of the armature 202. However, the passageway 214 may take other forms. For example, the passageway 214 may be one cylindrical passageway extending the entire length of the armature 202, a plurality of passageways, or other configurations, as will be apparent. As is also illustrated in FIG. 10, the armature 202 includes grooves 218 in the cylindrical exterior surface of the armature and grooves 220 in the bottom face of the armature. The grooves 218, 220 help relieve any pressure differential between an area upstream of the armature 202 and an area downstream of the armature with respect to the direction of flow $f$. The grooves 218, 220 also help reduce surface adhesion between the armature 202 and the leg 208.

The poppet 204 is attached to the armature 202, which is actuated by energizing the solenoid assembly 110. In the illustrated embodiment, the armature 202 includes a cylindrical passageway located downstream of the passageway 214 and matingly receives a first end portion of the poppet 204. The end portion of the poppet is preferably attached to the armature 202 with a welded connection, such as a YAG laser weld. However, alternative attachments are also contemplated. For example, the poppet 204 may be attached to the armature 202 at any variety of locations with an interference fit, an adhesive, a threaded or screwed attachment, a lock and key attachment, a retaining ring attachment, an electron beam weld, an ultrasonic weld, or other known attachments. Because the poppet 204 is attached to the armature 202, the poppet 204 will move with the armature 202 when the armature is actuated by energizing the solenoid assembly 110. In alternative embodiments, the passageway 214 of the armature 202 extends between the upstream end face and the opposing, downstream end face of the armature 202, i.e., the entire length of the armature, and the first end portion of the poppet is attached to the armature 202 at the downstream end face of the armature 202.

The poppet 204 is an elongated hollow tube for conveying the mixture of liquid fuel and pressurized gas, and includes a stem and a head 222. The inlet 216 of the poppet 204 opens into a tubular passageway 224, which extends from the inlet 216 to an outlet 226, which is located just upstream of the head 222. In the illustrated embodiment, the poppet 204 includes four slot-shaped outlets 226 that are equally spaced from each other and located approximately transverse to the longitudinal axis of the poppet 204. Although preferred that the poppet 204 have four slot-shaped outlets 226, other configurations will suffice. For example, the poppet 204 may include one slot-shaped outlet, two circular outlets, five oval outlets or ten pin sized outlets.

In an alternative embodiment of the air assist fuel injector 100, the poppet 204 does not include the passageway 224. Rather, the liquid fuel and air are conveyed outside the poppet 204 along an interior channel 230 of the leg 208.

The poppet head 222 is located downstream of the outlet 226 and is roughly mushroom shaped with a conical or angled face that seats against the seat member 206 when the solenoid coil 112 is not energized. When the armature 202 is actuated by energizing the solenoid coil 112, the poppet 204 moves with the armature 202 such that the head 222 is lifted off the seat member 206 in a direction away from the air assist fuel injector 100, i.e., in the direction of flow f. When the head 222 is lifted off the seat member 206, a seal is broken between the head 222 and the seat member 206 such that liquid fuel and gas exiting the outlets 226 exits the air assist fuel injector 100.

As is also illustrated in FIG. 10, movement of the poppet 204 is guided at a bearing 228 between the poppet 204 and the seat 206. Bearing 228 is located just upstream of the outlet 226 with respect to the direction of flow f of the liquid fuel and gas through the air assist fuel injector 100. Hence, the poppet 204 and the seat member 206 each include a bearing face for guiding movement of the poppet 204 near the head end of the poppet. Because the seat member 206 serves as a bearing for poppet movement and also absorbs the impact of the head 222 when the valve assembly 200 opens and closes, the seat member 206 is preferably fabricated from a wear and impact resistant material, such as hardened 440 stainless steel.

As is further illustrated in FIG. 10, the poppet 204 moves within the elongated channel 230 of the leg 208. The leg 208 is an elongated body through which the poppet 204 moves and which supports the seat 206. The interior channel 230 of the leg 208 through which the poppet 204 moves also serves as a secondary flow path for the pressurized gas. Hence, when the head 222 lifts off the seat 206, pressurized gas flows outside the poppet 204 but inside the leg 208 to help atomize the liquid fuel and gas exiting the outlet 226.

The spring 210 of the valve assembly 200 is located between the armature 202 and the leg 208. More particularly, the spring 210 sits within a recessed bore 232 that is concentric with the elongated channel 230 of the leg 208. The recessed bore 232 faces the armature 202 and defines the seat for the spring 210. This spring 210 is a compression spring having a first end that abuts the armature 202 and a second end that abuts the leg 208. The bottom of bore 232 defines a seat for the downstream of the spring 210 and a recess 234 defines a seat for the upstream end of the spring 210. The spring 210 functions to bias the armature 202 away from the leg 208. When the solenoid assembly 110 is not energized, the spring 210 biases the armature 202 away from the leg 208 and thus the poppet 204 is maintained in a closed position where the head 222 abuts against the seat member 206. However, when the solenoid coil 112 is energized, the electromagnetic force causes the armature 202 to overcome the biasing force of the spring 210 such that the armature 202 moves toward the leg 208 until it abuts against a stop surface 236 of the leg 208. When the solenoid coil 112 is de-energized, the electromagnetic force is removed and the spring 210 again forces the armature 202 away from the stop surface 236.

As illustrated in FIG. 4, the armature 202 is received by the sleeve 212 which is a cylindrical tube that extends at least a portion of the length of the armature 202. Movement of the armature 202 is guided by a bearing 238 between the outer surface of the armature 202 and the inner surface of the sleeve 212. Hence, the passageway of the sleeve 212 receives the armature 202 and slidably engages the armature 202. In an alternative embodiment, the interior surface of the sleeve 212 does not slidably engage the armature 202 and thus does not serve as a bearing surface for the armature. In this alternative embodiment, the air assist fuel injector may include an additional bearing at the poppet 204, similar to the bearing 238.

The sleeve 212 is located between the solenoid assembly 110 and the armature 202 so as to seal the solenoid assembly 110 from the liquid fuel and gas conveyed therethrough. Hence, the sleeve 212 has a first end located upstream of armature with respect to the direction of flow f and a second end located downstream of the armature 202 with respect to the direction of flow f such that the sleeve 212 seals the solenoid assembly 110 from the liquid fuel and gas flowing through the air assist fuel injector 100. As illustrated in FIG. 4, the passageway of the sleeve 212 receives the leg 208 at the second end of the sleeve, which is attached to the leg. However, the sleeve 212 may be attached to the leg at other locations and still be within the confines of the present invention.

Figure 18:
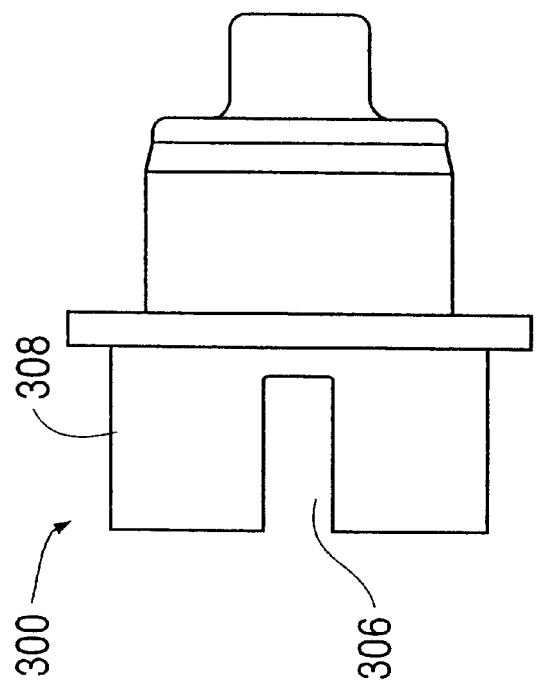
FIG. 18 is a side view of the cap illustrated in FIG. 17.
Figure 17:
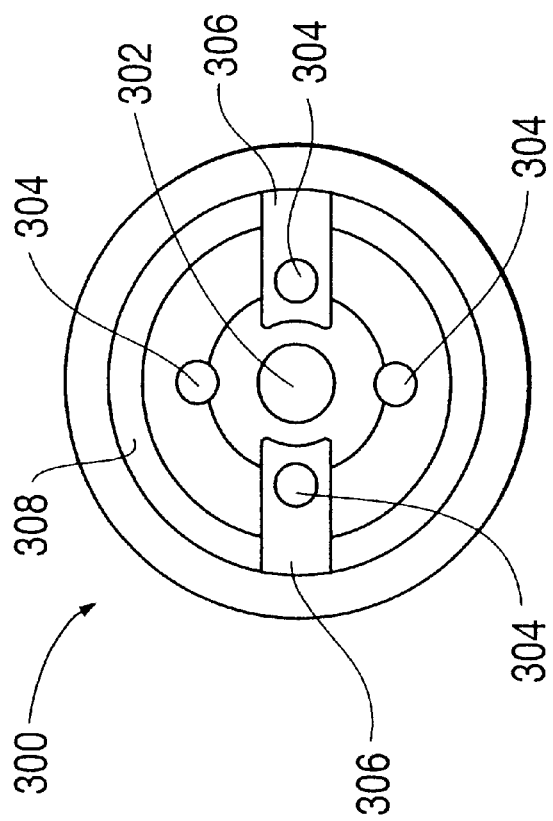
FIG. 17 is a top view of the cap of the air assist fuel injector illustrated in FIG. 1.

As is also illustrated by FIGS. 4, 5, 17, and 18, the air assist fuel injector 100 also includes a cap 300 located in the recess 135 and that directs liquid fuel and pressurized gas to the passageway 214 of the armature 202. As described further below, the cap 300 receives liquid fuel from a fuel injector and receives pressurized gas from the head of an engine. As illustrated in FIGS. 17 and 18, the cap 300 includes one fuel passageway 302 having an inlet that receives the majority of the liquid fuel and four gas passageways 304 that receive the majority of the pressurized gas. As will be apparent, the fuel passageway 302 also receives some pressurized gas and the gas passageways 304 also receive some liquid fuel. In the illustrated embodiment, the liquid fuel passageway 302 is located along the center axis of the cap, and the four gas passageways 304 are circumferentially and equally spaced about the liquid fuel passageway 302. As is also illustrated by FIGS. 17 and 18, the cap 300 further includes two slots 306 passing through an annular wall 308 at the upstream end of the cap 300. The slots 306 direct pressurized gas into the interior area 305 of the cap (see FIG. 4) where the inlets to the passageways 302, 304 are located. Each slot 306 is roughly offset ninety degrees relative to one of the conduits 132 as measured about the longitudinal center axis of the air assist fuel injector 100. That is, as illustrated in FIGS. 1 and 3, each slot 306 is not directly adjacent one of the conduits 132. In alternative embodiments, the cap 300 may have more or less passageways 302, 304 and slots 306. For example, the cap 300 may have two gas passageways 304, two fuel passageways 302, and three slots 306. In yet a further embodiment, the air assist fuel injector 100 does not include the cap 300. For example, the liquid fuel from the fuel injector and the pressurized gas may be delivered directly to the passageway 214 of the armature 202 without the assistance of the cap 300.

As further illustrated in FIG. 4, the sleeve 212 receives at least a portion of the cap 300, preferably such that the outlets of the passageways 302, 304 are located within the interior of the sleeve 212 so as to direct the liquid fuel and gas to the passageway 214 of the armature 202. As illustrated in FIG. 4, the throughole 115 of the solenoid assembly 110 receives the valve assembly 200, and the lower retainer 122 of the solenoid assembly 110 is attached to the leg 208 with a weld or other attachment at a ledge 237.

One embodiment of assembling the air assist fuel injector 100 is now described. The assembly process begins by assembling the valve assembly 200 or the solenoid assembly 110. The valve assembly 200 may also be assembled in parallel with the solenoid assembly 110. First, considering the assembly of the valve assembly 200, the sleeve 212 is fitted to the leg 208, preferably by press-fitting the sleeve 212 on to the reduced portion of the leg 208 at the upstream end of the leg 208. Thereafter, the sleeve 212 and the leg 208 combination are placed onto a fixture and the seat 206 is fitted to the leg 208, preferably by slip-fitting the seat 206 into a cavity in the downstream end of the leg 208. The seat 206 and the sleeve 212 are then attached to the leg 208, preferably by one or more hermetic YAG laser welds, although other attachments are also contemplated as described earlier. After the sleeve 212 and the seat 206 are attached to the leg 208, they are removed from the fixture, and the upstream end (seat side) of the poppet 204 is inserted into the tubular passageway 230 of the leg 208 until the poppet head 222 abuts against the seat 206. The spring 210 is then inserted into the annular area 232 between the poppet 204 and the interior surface of the leg 208 at the upstream end of the leg. Then, the armature 202 is fitted to the poppet 204, preferably by press-fitting the armature over the proximal end of the poppet. The armature 202 is then press-fit to such an extent that the armature compresses the spring 210 and the armature abuts the stop surface 236 of the leg 208. A pin or rod is then inserted into the passageway 214 of the armature 202 from the upstream side of the armature to push the poppet 204 back out of the armature 202 (in the direction of flow $f$) to set the stroke or lift of the armature. After the stroke of the armature 202 is set, the assembly of the valve assembly 200 is completed by attaching the poppet 204 to the armature 202 with a weld or other attachment roughly at the intersection or joint between the armature and the poppet.

Figure 22:
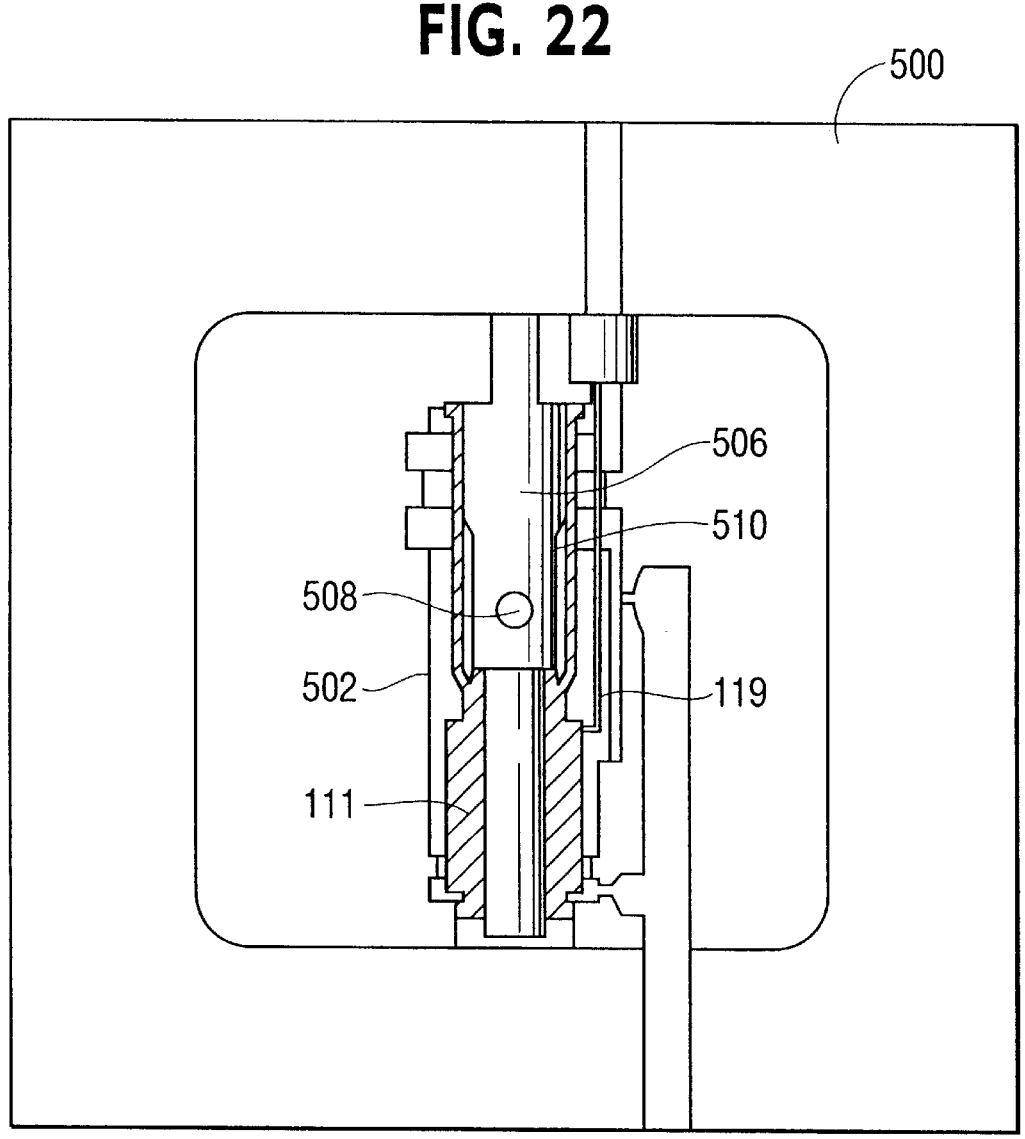
FIG. 22 is a side view of the mold block illustrated in FIG. 21, where the solenoid sub-assembly illustrated in FIGS. 14–16 and a pin are located in the mold cavity.
Figure 23:
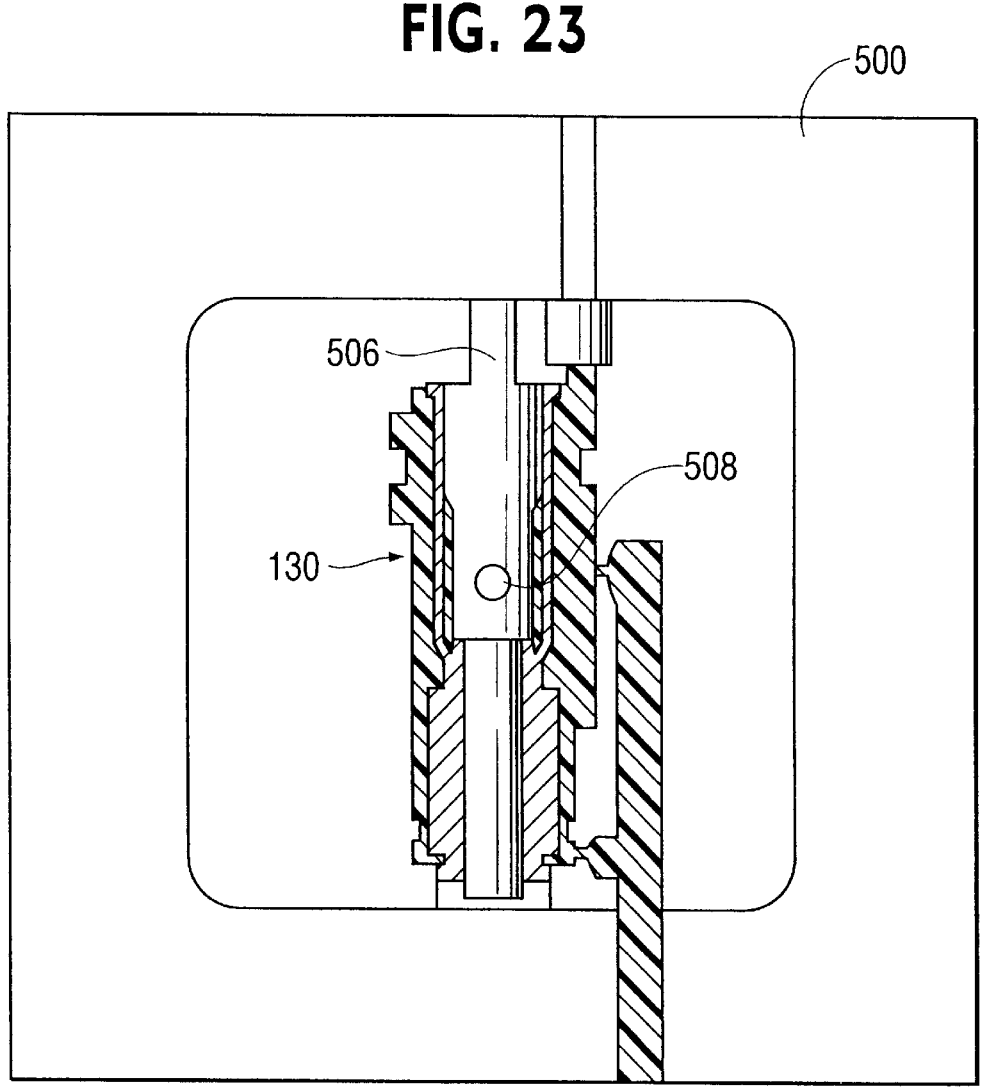
FIG. 23 is an illustrational side view of the mold block illustrated in FIG. 22, where the material for the casing has been injected into the mold to form the casing of the air assist fuel injector illustrated in FIG. 1.

The solenoid assembly 110 is assembled by winding the conductor of the coil 112 on the bobbin 114 and attaching the terminals 116 to the coil. The coil 112 and bobbin 114 are housed by pressing the lower retainer 122 into the tubular member 118, placing the solenoid coil 112 and bobbin 114 into the tubular member 118, pressing the top retainer 120 into the tubular member 118, and then welding the retainers 120, 122 to the tubular member 118. Thereafter, the metallic tube 124 is press-fit over the upper retainer 120 and welded to the upper retainer to obtain a solenoid sub-assembly 111 illustrated in FIGS. 14–16. To fabricate the preferred casing 130 of the solenoid assembly 110, the leads 119 are connected to the terminals 116 and the solenoid sub-assembly 111 is then located in a mold cavity 502 of a mold block 500, as illustrated in FIGS. 21–23.

Figure 21:
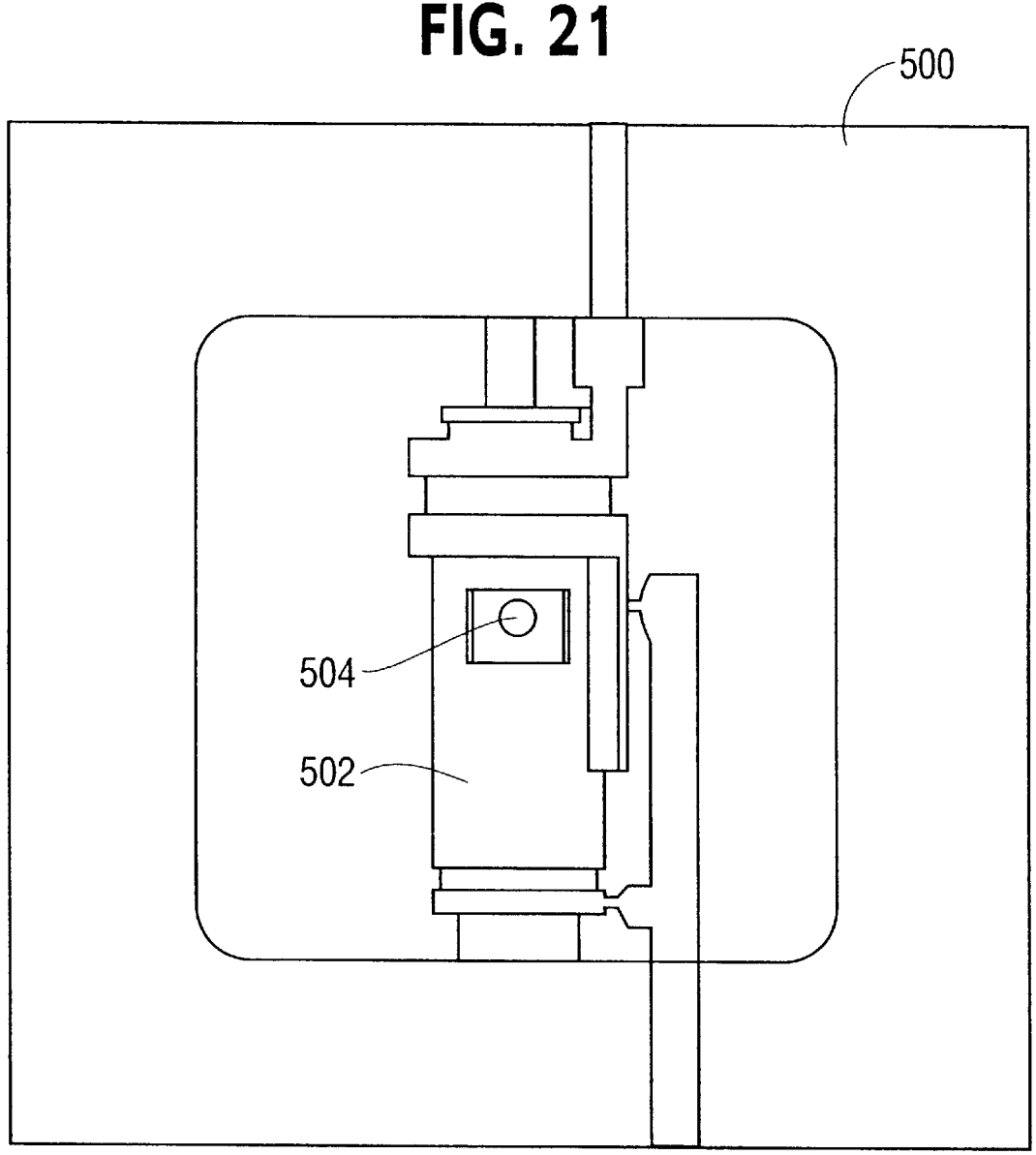
FIG. 21 is a side view of a one side of a mold block for creating the casing of the solenoid assembly of the air assist fuel injector illustrated in FIG. 1.

FIG. 21 illustrates one half of the mold cavity 502 before the solenoid sub-assembly 111 has been located therein. As illustrated in FIG. 21, the mold cavity 502 include a cylindrical projection 504 that defines one of the cavities 132 of the casing 130. FIG. 22 illustrates the mold block 500 after a pin 506 and the solenoid sub-assembly. 111 have been located in the cavity 502. As illustrated in FIG. 22, the pin 506 is inserted into the solenoid sub-assembly 111 prior to or after inserting the solenoid sub-assembly 111 into the cavity 502. The pin 506 includes two cylindrical recesses 508 (only one of which is apparent in FIG. 22). Each cylindrical recess 508 receives one of the cylindrical projections 504 in the mold cavity 502 when the opposite halves of the mold are closed. Each projection 504 defines one of the cavities 132 when the mold is closed and the material for the casing 130 is injected into the mold cavity 502. As is illustrated in FIG. 22, the pin 506 also includes a tapered section 510 which defines the tubular ledge 141 when the material for the casing 130 is injected into the mold cavity 502. FIG. 23 illustrates the mold block 500 after the material for the casing 130 has been injected into the mold cavity 502 to define the casing 130 of the solenoid assembly 110. The solenoid assembly 110 is completed by opening the mold, removing the flashing and the pin 506, and locating the seal members 127, 129 in their respective seat 113, 115.

After the valve assembly 200 and the solenoid assembly 110 are complete, the solenoid assembly is fitted to the valve assembly, preferably by pressing the solenoid assembly over the valve assembly. The solenoid assembly 110 is then attached to the valve assembly 200, preferably by a weld. After the solenoid assembly 110 and the valve assembly 200 are attached, an upper seal 340 is placed over the upstream end of the sleeve 212 and then the cap 300 is fitted to the remainder of the injector, preferably by press-fitting the cap 300 into the upstream end of the sleeve 212. Hence, the seal member 340 defines a seal between the cylinder 212, the cap 300, the upper retainer 120, and the lower portion of the tubular ledge 141 defined by the casing 130. To complete the assembly of the air assist fuel injector 100, the lower seal 213 and the carbon dam 215 are positioned in their respective seats on the leg 208.

Figure 19:
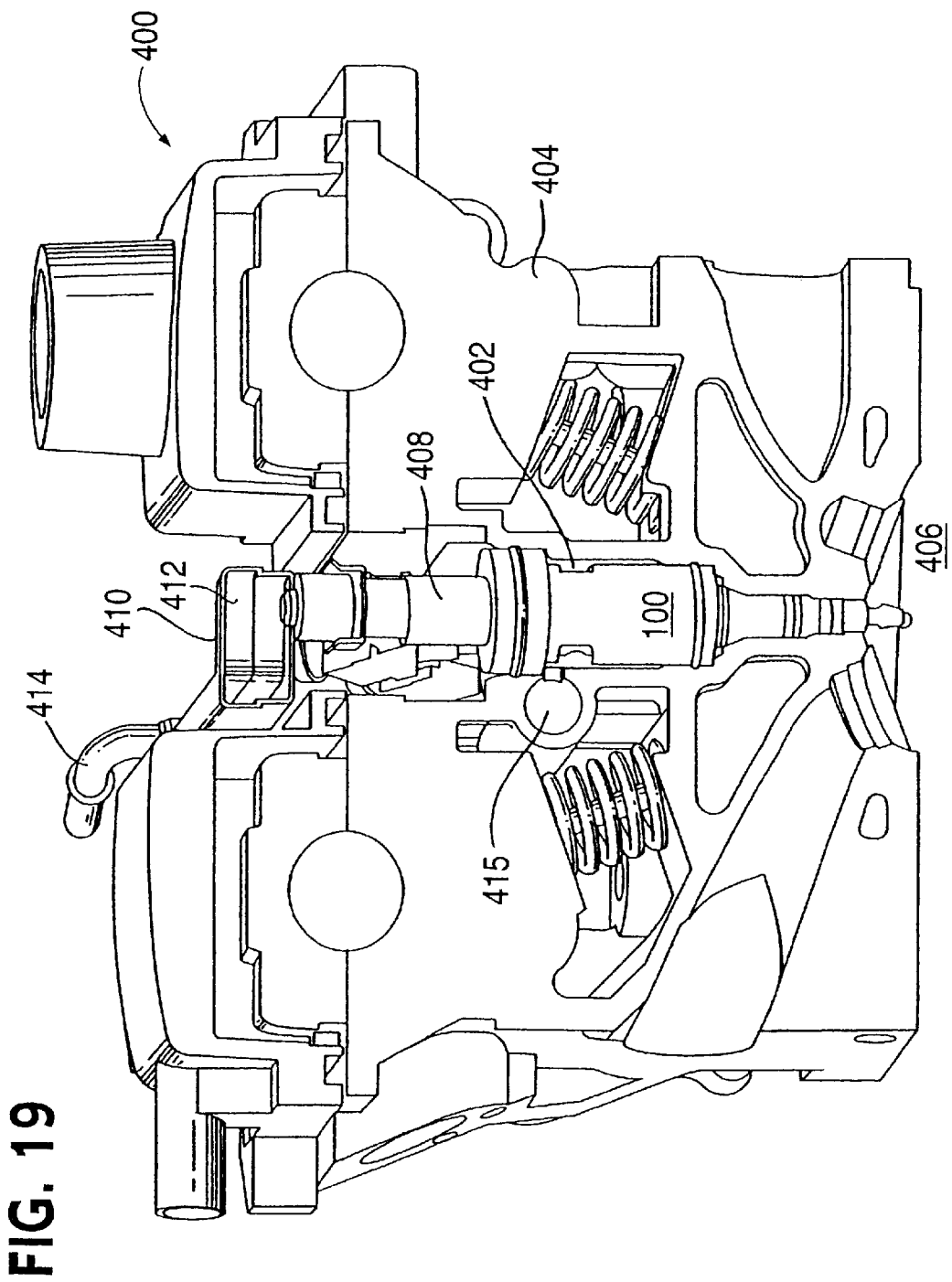
FIG. 19 is a partial cross-sectional view of a four stroke internal combustion engine, where the air assist fuel injector illustrated in FIG. 1 is located in a cavity of the head of the engine and a fuel injector is received by the air assist fuel injector.
Figure 20:
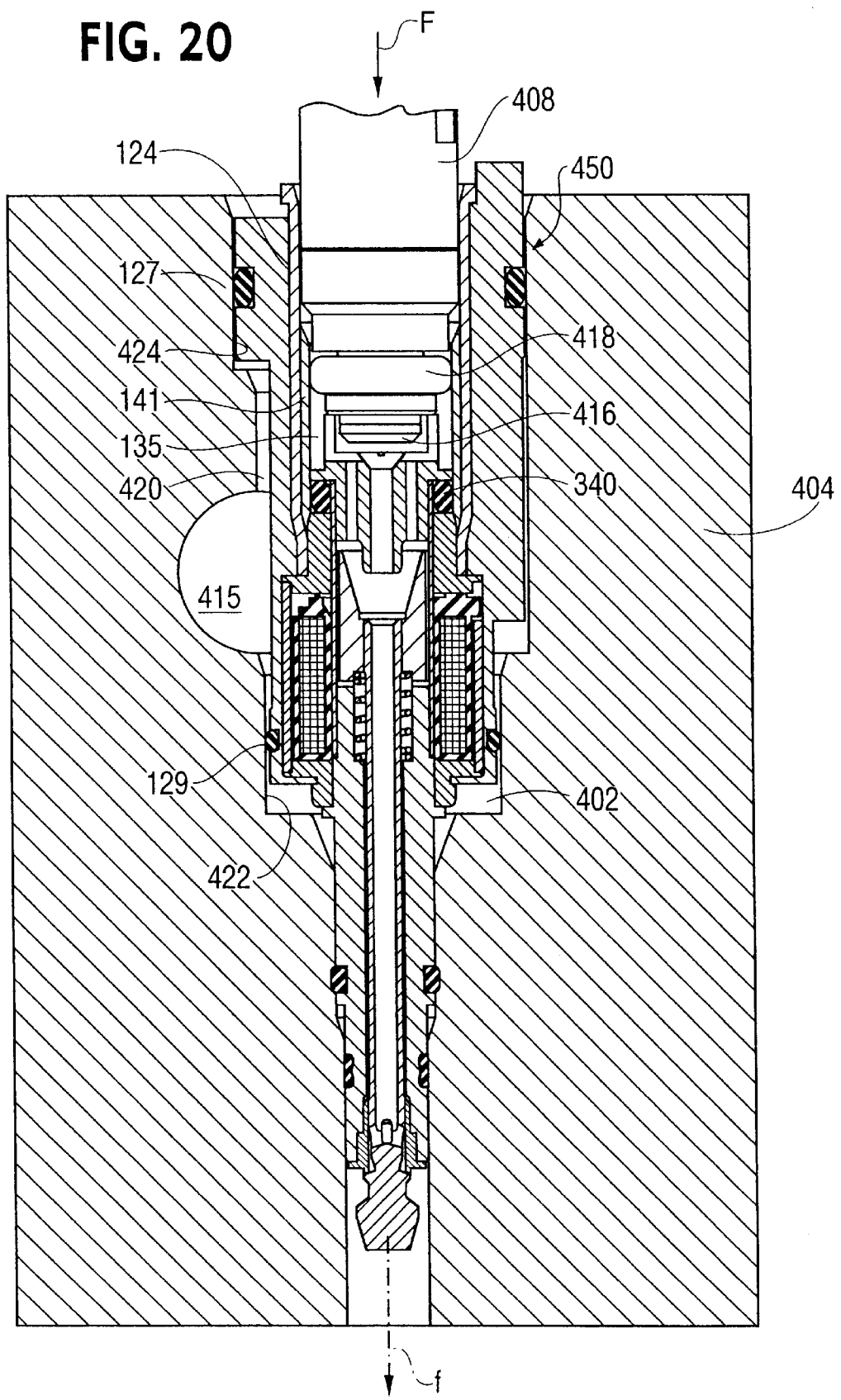
FIG. 20 is a partial cross-sectional view of the head, the air assist fuel injector, and the fuel injector illustrated in FIG. 19.

FIGS. 19 and 20 illustrate the air assist fuel injector 100 installed in a four stroke internal combustion engine 400. It will be appreciated that alternative embodiments of the air assist fuel injector 100 may be configured for operation with other engines. For example, an air assist fuel injector in accordance with the present invention may be configured for operation with a two stroke internal combustion engine, or any other engine having any number of cylinders.

To install the air assist fuel injector 100 in the engine 400, the air assist fuel injector is inserted into a cavity 402 of the head 404, which opens into a combustion chamber 406 of the engine 400, i.e. part of the engine in which combustion takes place, normally the volume of a cylinder between the piston crown and the cylinder head, although the combustion chamber may extend to a separate cell or cavity outside this volume. Hence, the air assist fuel injector 100 is located such that the atomized fuel that exits the air assist fuel injector 100 is delivered to the internal combustion chamber 406 of the engine.

Either before or after the air assist fuel injector 100 has been inserted into the cavity 402, a fuel injector 408 is inserted into the recess 135 of the air assist fuel injector 100. Examples of fuel injectors 408 that are suitable for delivering liquid fuel to the air assist fuel injector 100 include any top or bottom feed manifold port injector, commercially available from Bosch, Siemens, Delphi, Keihin, Sagem, Magnetti Marelli, or other multi-point fuel injector suppliers. As illustrated in FIG. 19, the fuel injector 408 is located at least partially in a cavity of a rail 410 configured for the four stroke engine 400. The rail 410 includes one or more internal passageways 412 or external lines 414 that deliver liquid fuel to the fuel injector 408. As described further below, the rail 410 does not include one or more passageways that deliver pressurized gas to the air assist fuel injector 100 because the air assist fuel injector 100 is advantageously configured to receive pressurized gas directly from the head 404 of the engine 400.

As illustrated in FIG. 20, the air assist fuel injector 100 includes a integral projection 450 (defined by the casing 130) that extends to a location upstream of the solenoid coil 112 and includes the recess 135. The integral projection 450 is a constituent of the air assist fuel injector 100; as a complete unit, the air assist fuel injector 100 includes the projection 450 extending in a direction away from the solenoid coil 112 and having the recess 135. The recess 135 of the integral projection 450 receives at least the outlet 416 of the fuel injector 408, which advantageously decreases the size of an air assist fuel injection system utilizing the air assist fuel injector 100. When received by the recess 135, the outlet 416 of the fuel injector 408 is located so as to deliver a metered quantity of liquid fuel directly to the cap 300 of the air assist fuel injector 100. However, in the preferred embodiment, the fuel injector 408 preferably does not contact the cap 300. Because of the proximity of the outlet 416 of the fuel injector 408 to the cap 300, the majority of the liquid fuel exiting from the fuel injector 408 will enter the fuel passageway 302 of the cap 300.

To help prevent liquid fuel and pressurized gas from escaping from the recess 135 that receives the fuel injector 408, a seal member 418 abuts at least one surface of the air assist fuel injector 100 and at least one surface of the fuel injector 408. In the illustrated embodiment, the seal member 418 is an o-ring received by a groove in the fuel injector 408. The seal member 418 is located within the recess 135, and the outlet 416 of the fuel injector 408 is located downstream of the seal member 418 with respect to a direction of flow F of liquid fuel from the fuel injector. The seal member 418 is also located upstream of the conduits 132 with respect to the direction of the flow $f$. The seal member 418 abuts an interior surface of the casing 130, specifically the portion of the tubular ledge 141 located upstream of the conduits 132. In an alternative embodiment, the seal member 418 abuts the metallic tube 124. In yet a further embodiment in which the air assist fuel injector does not include the metallic tube 124 or the tubular ledge 141, the seal member 418 abuts another surface of the casing, such as a groove in the casing that receives the seal member 418.

To help prevent liquid fuel and pressurized gas from leaking and entering other portions of the air assist fuel injector 100 besides the cap 300, the seal member 340 abuts the sleeve 112, the cap 300, the upper retainer 120, and the portion of the tubular ledge 141 downstream of the conduit 132. Some materials for the casing 130, such as NYLON, absorb liquid and thus expand and contract during different operating conditions, which is problematic when the casing defines a seal. One advantage of the metallic tube 124 and the tubular ledge 141 is that the narrow or thin cross-section of the tubular ledge 141 backed by the metallic tube 124 defines a reliable sealing surface because it is less susceptible to drastic changes in size due to absorption of liquids during different operating conditions.

The pressurized gas is communicated to the recess 135 via the conduits 132, which are located on opposite sides of the air assist fuel injector 100. The pressurized gas is supplied to the cavity 402 of the head 404 via a channel 415 in the head 404. As illustrated in FIG. 20, the cavity 402 includes an annular flow path 420 about the circumference of the casing 130 near the conduits 132 such that pressurized gas from the channel 415 may flow around the casing and into both conduits 132. Hence, the pressurized gas from the channel 415 flows into the flow path 420 of the cavity 402, into the conduits 132, and into the recess 135. To help prevent pressurized gas from leaking from the cavity 402, the seal member 129 abuts a surface 422 of the cavity 402 and the casing 130, and the seal member 127 abuts a surface 424 of the cavity 402 and the casing 130. The channel 415 and the conduits 132 are located downstream of the seal member 127 with respect to the direction of flow $f$, and the seal member 129 is located downstream of the conduit 415 and the conduits 132 with respect to the direction of flow $f$. This configuration helps prevent pressurized gas from leaking into the combustion chamber 406 and out of the head 404.

As is also illustrated in FIGS. 19 and 20, when the fuel injector 408 is inserted in the recess 135, the longitudinal center axis of the air assist fuel injector 100 is substantially coaxial with the longitudinal center axis of the fuel injector 408. That is, the fuel injector 408 and the air assist fuel injector 100 are in line with each other. However, in alternative embodiments, the recess 135 may be located at an angle with respect to the longitudinal axis of the valve assembly 200 such that when the fuel injector 408 is inserted in the recess 135 the longitudinal center axis of the air assist fuel injector 100 is angled with respect to the longitudinal center axis of the fuel injector 408. For example, the fuel injector 408 may be transverse to the air assist fuel injector. Such a configuration may be suitable for applications other than four stroke engines, such as some two stroke applications and outboard motor applications.

The pressurized gas in the recess 135 of the integral projection 450 is conveyed through the slots 306 of the cap 300, through the passageways 302, 306, and into the passageway 214 of the armature 202, which is located immediately downstream of the cap 202 with respect to the direction of flow $f$. The liquid fuel and pressurized gas mix in the passageway 214 of the armature 202 and are conveyed to the inlet 216 of the poppet 204. Thereafter, the liquid fuel and gas travel through the tubular passageway 224 of the poppet 204. When the solenoid assembly 110 is energized, the armature 202 overcomes the biasing force of the spring 210 and moves toward the leg 208 until it seats against the stop surface 236. Because the poppet 204 is attached to the armature 202, the head 222 of the poppet 204 lifts off the seat 206 in the direction of flow $f$ when the armature 202 is actuated. When the head 222 lifts off of the seat 206, a seal between the head and the seat is broken and the gas and fuel mixture exits the outlet 226. The mixture exiting the outlets 226 is then forced out of the air assist fuel injector 100 over the head 222 such that a metered quantity of atomized liquid fuel is delivered to the combustion chamber 406 of the engine 400.

When the previously described solenoid assembly 110 is de-energized, the biasing force of the spring 210 returns the armature 202 to its original position. Because the poppet 204 is attached to the armature 202, the head 222 of the poppet 204 returns to the seat 206 to define a seal that prevents further gas and fuel from exiting the air assist fuel injector 100. Hence, the air assist fuel injector atomizes the liquid fuel supplied by the conventional fuel injector 408 with the pressurized gas supplied via the cavity 415 of the head 404. The atomized fuel is then delivered to the combustion chamber 406 of the engine 400, where it is ignited to power the engine.

The air assist fuel injector 100 is referred to as "air assist" because it preferably utilizes pressurized air to atomize liquid fuel. The pressure of the air is roughly at 550 KPa for two stroke applications and at roughly 650 KPa for four stroke applications, while the pressure of the liquid fuel is roughly between 620 and 1500 KPa and is typically higher than the air pressure. Preferably, the fuel pressure is between 620 and 800 KPa. Although it is preferred that the air assist fuel injector atomize liquid gasoline supplied by the fuel injector 408 with pressurized air delivered by the conduit 415 of the head 404, it will be realized that the air assist fuel injector 100 may atomized many other liquid combustible forms of energy with any of a variety of gases. For example, air assist fuel injector 100 may atomize liquid kerosene or liquid methane with pressurized gaseous oxygen, propane, or exhaust gas. Hence, the term "air assist" is a term of art, and as used here and is not intended to dictate that the air assist fuel injector 100 be used with only pressurized air.

The principles, preferred embodiments, and modes of operation of the present invention have been described in the foregoing description. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the present invention is defined in the claims be embraced thereby.

What is claimed is:

1. An air assist fuel injector comprising: an armature;
   a solenoid assembly having a casing and a solenoid coil for actuating said armature, said solenoid coil located at least partially in said casing, said casing having a wall that defines a recess for receiving at least an outlet of a fuel injector, said wall including at least one conduit passing therethrough, said conduit communicating an area external said casing with said recess, said conduit being separate from said recess, said solenoid assembly further including a metallic housing that houses said solenoid coil, said casing abutting at least a portion of a cylindrical and exterior surface of said metallic housing;
   a metallic tube attached to said metallic housing and extending to a location upstream of said solenoid coil with respect to a direction of flow of liquid fuel and gas through said air assist fuel injector, said metallic tube having a wall with at least one conduit passing therethrough; and
   a poppet attached to said armature such that said poppet is actuated when said solenoid coil is energized.

2. The air assists fuel injector of claim 1, said casing being formed of electrically insulative material.

3. The air assist fuel injector of claim 2, said electrically insulative material including a glass-filled nylon.

4. The air assist fuel injector of claim 1, said casing being injection molded.

5. The air assist fuel injector of claim 1, said casing abutting an entirety of said cylindrical and exterior surface of said metallic housing.

6. The air assist fuel injector of claim 1, said casing abutting at least a portion of an exterior surface of said metallic tube.

7. The air assist fuel injector of claim 1, said metallic tube being attached to said metallic housing by a weld.

8. The air assist fuel injector of claim 1, said conduit of said casing being located within a periphery of said conduit of said metallic tube.

9. The air assist fuel injector of claim 1, said casing passing through said conduit of said metallic tube and abutting an interior surface of said wall of said metallic tube, a portion of said casing abutting said interior surface of said metallic tube having a surface that defines a seat for a seal member of the fuel injector when the fuel injector is inserted into said recess of said casing.

10. The air assist fuel injector of claim 9, said casing abutting an exterior surface of said wall of said metallic tube.

11. The air assist fuel injector of claim 1, said solenoid assembly including at least two electrical leads, said casing abutting said electrical leads.

12. The air assist fuel injector of claim 1, a portion of said recess for receiving at least the outlet of the fuel injector being located upstream of said solenoid coil with respect to a direction of flow of liquid fuel and gas through said air assist fuel injector.

13. The air assist fuel injector of claim 1, said conduit being a first conduit, said wall including a second conduit passing therethrough.

14. The air assist fuel injector of claim 1, said casing including a first groove for receiving a first seal member and a second groove for receiving a second seal member, said conduit being located downstream of said first groove with respect to a direction of flow of liquid fuel and gas through said air assist fuel injector, said second groove being located downstream of said conduit with respect to said direction of flow.

15. The air assist fuel injector of claim 1, said casing extending to a location upstream of said solenoid coil with respect to a direction of flow of liquid fuel and gas through said air assist fuel injector, said casing extending to a location downstream of said solenoid coil with respect to said direction of flow.

16. An air assist fuel injector comprising:
    an armature;
    a solenoid assembly having a casing and a solenoid coil for actuating said armature, said solenoid coil located at least partially in said casing, said casing having a wall that defines a recess for receiving at least an outlet of a fuel injector, said wall including at least one conduit passing therethrough, said conduit communicating an area external said casing with said recess, said conduit being separate from said recess; and
    a poppet attached to said armature such that said poppet is actuated when said solenoid coil is energized, said armature having a passageway for conveying liquid fuel and gas, said air assist fuel injector further comprising a cap located in said recess, located adjacent said armature, and having a plurality of channels for delivering said liquid fuel and gas to said passageway of said armature.

17. The air assist fuel injector of claim 16, said poppet including a tubular member having an internal passageway for conveying liquid fuel and gas delivered from said passageway of said armature.

18. An assembly comprising:
    an air assist fuel injector having an integral projection with a recess therein, said integral projection including casing molded around a metallic tube, said molded casing having a wall with a conduit passing therethrough, said metallic tube having a wall with a conduit passing therethrough, said conduit of said casing being located within said conduit of said metallic tube;
    a fuel injector having an outlet for delivering liquid fuel to said air assist fuel injector, said recess of said air assist fuel injector receiving at least an outlet of said fuel injector; and
    a seal member abutting at least one surface of said air assist fuel injector and at least one surface of said fuel injector, said seal member being located within said recess, said outlet of said fuel injector being located downstream of said seal member with respect to a direction of flow of liquid fuel from said fuel injector.

19. The assembly of claim 18, said air assist fuel injector including a solenoid assembly having at least two electrical leads, said leads being located at least partially in said casing, said casing defining said recess.

20. The assembly of claim 19, said solenoid assembly including a metallic housing that houses at least a solenoid coil of said solenoid assembly, said molded casing abutting said metallic housing.

21. The assembly of claim 18, said air assist fuel injector including a solenoid coil, said integral projection extending to a location upstream of said solenoid coil with respect to a direction of flow of liquid fuel and gas through said air assist fuel injector.

22. The assembly claim 18, said air assist fuel injector including a metallic solenoid housing, said metallic tube being attached to said metallic solenoid housing.

23. The assembly of claim 18, a longitudinal center axis of the air assist fuel injector being substantially coaxial with a longitudinal center axis of the fuel injector.

24. The assembly of claim 18, said conduit being a first conduit, said wall of said metallic tube further including a second conduit passing therethrough.

25. The assembly of claim 18, further comprising an engine having at least one combustion chamber and a cylinder head, said cylinder head having a cavity that opens into said combustion chamber and a channel for communicating pressurized gas to said cavity, said air assist fuel injector being located at least partially within said cavity.

26. The assembly of claim 25, said seal member being a first seal member, further comprising a second seal member and a third seal member, said second seal member abutting a surface of said cavity and said air assist fuel injector, said a second seal member abutting said surface of said cavity and said air assist fuel injector, said conduit being located downstream of said second seal member with respect to a direction of flow of liquid fuel and gas through said air assist fuel injector, said third seal member being located downstream of said conduit with respect to said direction of flow, said channel being located downstream of said second seal member with respect to said direction of flow and located upstream of said third seal member with respect to said direction of flow.

27. An assembly comprising:
an air assist fuel injector having an integral projection with a recess therein, said integral projection including a metallic tube, said metallic tube having a wall with a conduit passing therethrough, said integral projection including a molded casing abutting an exterior surface of said wall of said metallic tube, passing through said conduit of said metallic tube, and contacting an interior surface of said wall of said metallic tube;
a fuel injector having an outlet for delivering liquid fuel to said air assist fuel injector, said recess of said air assist fuel injector receiving at least an outlet of said fuel injector; and
a seal member abutting at least one surface of said air assist fuel injector and at least one surface of said fuel injector, said seal member being located within said recess, said outlet of said fuel injector being located downstream of said seal member with respect to a direction of flow of liquid fuel from said fuel injector.

28. The assembly of claim 27, said at least one surface of said air assist fuel injector including a surface of said molded casing.

29. An assembly comprising
an air assist fuel injector having an integral projection with a recess therein, an armature having a passageway for conveying liquid fuel and gas, and a cap located adjacent said armature and having a plurality of channels for delivering liquid fuel and gas to said passageway of said armature;
a fuel injector having an outlet for delivering liquid fuel to said air assist fuel injector, said recess of said air assist fuel injector receiving at least an outlet of said fuel injector; and
a seal member abutting at least one surface of said air assist fuel injector and at least one surface of said fuel injector, said seal member being located within said recess, said outlet of said fuel injector being located downstream of said seal member with respect to a direction of flow of liquid fuel from said fuel injector.

30. An assembly comprising:
a fuel injector having an outlet for delivering liquid fuel;
an engine having at least one combustion chamber and a cylinder head, said cylinder head having a cavity that opens into said combustion chamber and a channel for communicating pressurized gas to said cavity;
an air assist fuel injector located at least partially within said cavity and comprising:
an integral projection having a recess that receives at least said outlet of said fuel injector, said integral projection including a conduit for receiving pressurized gas from said channel, and a casing molded over a tubular member, said casing and said tubular member defining said conduit,
an armature having a passageway for conveying liquid fuel and gas, and
a poppet attached to said armature and having an internal passageway for conveying liquid fuel and gas received from said passageway of said armature;
a first seal member abutting said cavity and said air assist fuel injector, said first seal member being located upstream of said channel with respect to a direction of flow of liquid fuel and gas through said air assist fuel injector;
a second seal member abutting said cavity and said air assist fuel injector, said second seal member being located downstream of said channel with respect to said direction of flow; and
a third seal member abutting said fuel injector and a surface of said recess, said third seal member being located upstream of said conduit with respect to said direction of flow.

31. A method comprising:
inserting an air assist fuel injector into a cavity of an engine that opens into a combustion chamber of the engine, the air assist fuel injector including a solenoid coil and an integral projection located upstream of said solenoid coil with respect to a direction of flow of liquid fuel and gas through said air assist fuel injector, said integral projection including a molded casing having a first seat and a second seat, the first seat receiving a first seal member, the second seat receiving a second seal member;
inserting a fuel injector into a recess of the integral projection;
defining a first seal between the cavity and the air assist fuel injector with the first seal member;
defining a second seal between the cavity and the air assist fuel injector with the second seal member; and
defining a third seal between the fuel injector and the air assist fuel injector within the recess of the integral projection.

32. The method of claim 31, further comprising:
providing pressurized gas to a conduit of the air assist fuel injector via a channel in a head of the engine, the conduit of the air assist fuel injector being located downstream of the first seal with respect to a direction of flow of liquid fuel and gas through said air assist fuel injector and upstream of the second seal with respect to the direction of flow.

33. The method of claim 31, a longitudinal center axis of the air assist fuel injector being substantially coaxial with a longitudinal center axis of the fuel injector after said inserting the fuel injector into the recess.

34. The method of claim 31, said inserting the fuel injector being after said inserting the air assist fuel injector.

35. An air assist fuel injector comprising:
an armature having a passageway for receiving liquid fuel and pressurized gas;
a solenoid coil; and
an integral projection located at least partially upstream of said solenoid coil with respect to a direction of flow of liquid fuel and the pressurized gas through said air assist fuel injector, said integral projection having a wall that defines a recess for receiving at least an outlet of a fuel injector, said wall including a conduit passing therethrough for communicating the pressurized gas to said recess, said recess being separate from said conduit.

36. The air assist fuel injector of claim 35, further comprising:
a cap located upstream of said armature with respect to a direction of flow of liquid fuel and gas through said air assist fuel injector, said cap having a plurality of channels for receiving the pressurized gas from said conduit and liquid fuel from the fuel injector.

37. The air assist fuel injector of claim said integral projection including a molded casing.

38. The air assist fuel injector of claim 37, further comprising a metallic tube having means for removing the air assist fuel injector from a head of an engine.

39. The air assist fuel injector of claim 38, said metallic tube having a wall with a conduit passing therethrough for communicating gas to said recess.

40. A solenoid assembly of an air assist fuel injector comprising
a solenoid coil and a metallic tube located at least partially within a molded body of electrically insulative material, said body having a recess for receiving at least an outlet of a fuel injector, said molded body having a wall with a conduit passing therethrough for communicating pressurized gas to said recess, said metallic tube having a wall with a conduit passing therethrough, said conduit of said casing being located within said conduit of said metallic tube.

41. An assembly comprising:
a fuel injector having an outlet for delivering liquid fuel;
an air assist fuel injector comprising a casing that defines an exterior surface of said air assist fuel injector and that at least partially encases a tubular member, said tubular member being a different material than said casing, said casing having a conduit for receiving pressurized gas from a channel inside the head of an engine and having a recess that receives at least an outlet of said fuel injector, said casing including a first seat that receives a first seal member, said first seat being located upstream of said conduit as measured with respect to a direction of flow of liquid fuel and gas through said air assist fuel injector, said casing including a second seat that receives a second seal member, said second seat being located downstream of said conduit as measured with respect to said direction of flow; and
a third seal member that abuts said casing and said fuel injector.

42. The assembly of claim 41, said air assist fuel injector including cap for receiving liquid fuel from said fuel injector and pressurized gas form said conduit.

43. The assembly of claim 42, said tubular member including a metallic material and said casing including an electrically insulative material.

44. The assembly of claim 42, tubular member being attached to a housing of a solenoid coil.

45. The assembly of claim 42, said tubular member including a conduit, said casing passing at least partially through said conduit of said conduit of said tubular member.

46. The assembly of claim 42, further comprising an engine that receives said air assist fuel injection.

47. The assembly of claim 41, said tubular member including means for removing said air assist fuel injector from an engine.

48. An air assist fuel injector comprising:
a casing molded over a tubular member, said casing defining a recess for receiving a fuel injector, said casing and said tubular member including different materials, said casing having a conduit that is located so as to receive gas from a channel within a head of an engine when the air assist fuel injector is located in the head of the engine, said conduit being configured and located to communicate the received gas to a location inside said air assist fuel injector where metered quantities of fuel are delivered to said air assist fuel injector from an outlet of the fuel injector.

49. The air assist fuel injector of claim 48, said casing passing through a conduit of said tubular member and abutting an interior surface of a wall of said tubular member.

50. The air assist fuel injector of claim 49, a portion of said casing abutting said interior surface of said tubular member having a surface configured to define a seat for a seal member of a fuel injector when the fuel injector is inserted into said recess of said casing.

51. An assembly comprising:
an air assist fuel injector having a molded casing and a metallic tube that is at least partially encased by said molded casing, said molded casing having a wall with a conduit passing therethrough for conveying pressurized gas to an interior of said air assist fuel injector, said metallic tube having a wall with a conduit passing therethrough, said conduit of said casing being located within said conduit of said metallic tube.

52. The air assists fuel injector of claim 51, said molded casing being formed of an electrically insulative material.

53. The air assist fuel injector of claim 52, said electrically insulative material including a glass-filled nylon.

54. The air assist fuel injector of claim 51, said molded casing being injection molded.

55. The air assist fuel injector of claim 51, further comprising a solenoid assembly having a metallic housing that houses a solenoid coil, said molded casing abutting at least a portion of a cylindrical and exterior surface of said metallic housing.

56. The air assist fuel injector of claim 55, said molded casing abutting an entirety of said cylindrical and exterior surface of said metallic housing.

57. The air assist fuel injector of claim 55, said metallic tube extending to a location upstream of said solenoid coil with respect to a direction of flow of liquid fuel and gas through said air assist fuel injector.

58. The air assist fuel injector of claim 55, said metallic tube being attached to said metallic housing by a weld.

59. The air assist fuel injector of claim 51, said molded casing abutting an interior surface of said wall of said metallic tube.

60. The air assist fuel injector of claim 59, a portion of said casing abutting said interior surface of said metallic tube having a surface that is configured and located to defines a seat for a seal member of a fuel injector when the fuel injector is inserted into said recess of said casing.

61. The air assist fuel injector of claim 51, further comprising at least two electrical leads, said casing abutting said electrical leads.

62. The air assist fuel injector of claim 51, further comprising an armature and a poppet each having a passageway for conveying liquid fuel and gas, said recess being located upstream of said armature and said poppet with respect to a direction of flow of liquid fuel and gas through said air assist fuel injector.

63. The air assist fuel injector of claim 51, said molded casing including a first groove for receiving a first seal member and a second groove for receiving a second seal member, said conduit being located downstream of said first groove with respect to a direction of flow of liquid fuel and gas through said air assist fuel injector, said second groove being located downstream of said conduit with respect to said direction of flow.

64. The air assist fuel injector of claim 51, further comprising:
an armature having a passageway for conveying liquid fuel and gas;
a cap located in said recess, located adjacent said armature, and having a plurality of channels for delivering the liquid fuel and gas to said passageway of said armature.

65. The air assist fuel injector of claim 51, further comprising a solenoid coil, said molded casing extending to a location upstream of said solenoid coil with respect to a direction of flow of liquid fuel and gas through said air assist fuel injector, said casing extending to a location downstream of said solenoid coil with respect to said direction of flow.

66. An assembly comprising:
an engine having a head with a channel for delivering gas;
an air assist fuel injector located at least partially in said head and having a solenoid assembly, a metallic tube that defines a recess, and a casing that encases at least a portion of said solenoid assembly and at least a portion of said metallic tube, said casing and said metallic tube each having at least one conduit for receiving gas from said channel; and
a fuel injector having an outlet for delivering liquid fuel to said air assist fuel injector, said recess receiving at least said outlet of said fuel injector.

67. An assembly comprising:
a fuel injector having an outlet for delivering liquid fuel;
an air assist fuel injector comprising an integral projection having a recess that receives at least said outlet of said fuel injector, said integral projection including a conduit for receiving pressurized gas from a channel within a head of an engine, an armature having a passageway for conveying liquid fuel and gas, and a poppet attached to said armature and having an internal passageway for conveying liquid fuel and gas received from said passageway of said armature;
a first seal member located in a seat of said integral projection at a location upstream of said conduit with respect to a direction of flow of liquid fuel and gas through said air assist fuel injector;
a second seal member located in a seat of said integral projection at a location downstream of said conduit with respect to said direction of flow;
a third seal member abutting said fuel injector and a surface of said recess, said third seal member being located upstream of said conduit with respect to said direction of flow; and
a fourth seal member located within said air assist fuel injector, said fourth seal member being located downstream of the outlet of the fuel injector and upstream of said armature.

68. An assembly comprising:
an air assist fuel injector having an integral projection with a recess therein, said integral projection including a metallic tube, said metallic tube having a wall with a conduit passing therethrough, said integral projection including a molded casing abutting an exterior surface of said wall of said metallic tube, passing through said conduit of said metallic tube, and contacting an interior surface of said wall of said metallic tube.

69. The air assists fuel injector of claim 68, said molded casing being formed of an electrically insulative material.

70. The air assist fuel injector of claim 68, said molded casing being injection molded.

71. The air assist fuel injector of claim 68, further comprising a solenoid assembly having a metallic housing that houses a solenoid coil, said molded casing abutting at least a portion of a cylindrical and exterior surface of said metallic housing.

72. The air assist fuel injector of claim 71, said molded casing abutting an entirety of cylindrical and exterior surface of said metallic housing.

73. The air assist fuel injector of claim 71, said metallic tube extending to a location upstream of said solenoid coil with respect to a direction of flow of liquid fuel and gas through said air assist fuel injector.

74. The air assist fuel injector of claim 68, said molded casing abutting an interior surface of said wall of said metallic tube.

75. The air assist fuel injector of claim 68, further comprising an armature and a poppet each having a passageway for conveying a liquid fuel and gas, said recess being located upstream of said armature and said poppet with respect to a direction of flow of liquid fuel and gas through said air assist fuel injector.

76. The air assist fuel injector of claim 68, said molded casing including a first groove for receiving a first seal member and a second groove for receiving a second seal member, said conduit being located downstream of said first groove with respect to a direction of flow of liquid fuel and gas through said air assist fuel injector, said second groove being located downstream of said conduit with respect to said direction of flow.

77. The air assist fuel injector of claim 68, further comprising:
an armature having a passageway for conveying liquid fuel and gas;
a cap located in said recess, located adjacent said armature, and having a plurality of channels for delivering the liquid fuel and gas to said passageway of said armature.

78. The air assist fuel injector of claim 68, further comprising a solenoid coil, said molded casing extending to a location upstream of said solenoid coil with respect to a direction of flow of liquid fuel and gas through said air assist fuel injector, said casing extending to a location downstream of said solenoid coil with respect to said direction of flow.

79. A method comprising:
molding a casing over a metallic tube and a solenoid assembly, the metallic tube including a wall with a conduit passing therethrough, said molded casing passing through said conduit and abutting an interior surface of said tube; and assembling an air assist fuel injector with the molded casing and metallic tube, the conduit for receiving pressurized gas from a channel within the head of an engine when the air assist fuel injector is located within the head of the engine.

80. The method of claim 79, further comprising:

inserting a fuel injector into the metallic tube such that a seal abuts the molded casing within the metallic tube.

81. The method of claim 80, further comprising:

inserting the assembled air assist fuel injector into an engine.

82. A method comprising:

molding a casing over a metallic tube and a solenoid assembly, the metallic tube including a wall with a conduit passing therethrough, said molded casing passing through said conduit; and assembling an air assist fuel injector with the molded casing and metallic tube, the conduit for receiving pressurized gas from a channel within the head of an engine when the air assist fuel injector is located within the head of the engine.

* * * * *

UNITED STATES PATENT AND TRADEMARK OFFICE
CERTIFICATE OF CORRECTION

PATENT NO. : 6,561,167 B2
DATED : May 13, 2003
INVENTOR(S) : Carsten Berndt

It is certified that error appears in the above-identified patent and that said Letters Patent is hereby corrected as shown below:

<u>Column 5,</u>
Line 33, change "n" to -- in. --.

Signed and Sealed this

Thirtieth Day of December, 2003

JAMES E. ROGAN
*Director of the United States Patent and Trademark Office*